US012747824B2

(12) United States Patent
LaGoy et al.

(10) Patent No.: US 12,747,824 B2
(45) Date of Patent: Sep. 29, 2026

(54) STACK CONTAINMENT STRUCTURE

(71) Applicant: Dexterity, Inc., Redwood City, CA (US)

(72) Inventors: Matthew LaGoy, Redwood City, CA (US); Matthew Rodolfo Molina, San Francisco, CA (US); Alberto Leyva Arvayo, Palo Alto, CA (US); Andrew Lovett, Burlingame, CA (US); Robert Holmberg, Mountain View, CA (US); Vikas Agrawal, Santa Clara, CA (US); Jimmy Tang, San Jose, CA (US); Derek Pan, Palo Alto, CA (US)

(73) Assignee: Dexterity, Inc., Redwood City, CA (US)

( * ) Notice: Subject to any disclaimer, the term of this patent is extended or adjusted under 35 U.S.C. 154(b) by 905 days.

(21) Appl. No.: 17/960,542

(22) Filed: Oct. 5, 2022

(65) Prior Publication Data

US 2023/0107488 A1 Apr. 6, 2023

Related U.S. Application Data

(60) Provisional application No. 63/253,048, filed on Oct. 6, 2021.

(51) Int. Cl.

| | |
|---|---|
| ***F16M 11/22*** | (2006.01) |
| ***B25J 9/00*** | (2006.01) |
| ***B65G 61/00*** | (2006.01) |

(52) U.S. Cl.

CPC ............ *F16M 11/22* (2013.01); *B25J 9/0096* (2013.01); *B65G 61/00* (2013.01); *B65G 2201/0258* (2013.01); *F16M 2200/08* (2013.01)

(58) Field of Classification Search

CPC ......... F16M 11/22; B25J 9/005; B65G 61/00; B65G 47/904

See application file for complete search history.

(56) References Cited

U.S. PATENT DOCUMENTS

| | | | | |
|---|---|---|---|---|
| 6,238,173 | B1 * | 5/2001 | Corsini | B65G 47/086 414/789.5 |
| 7,544,038 | B2 * | 6/2009 | Gerding | B65G 60/00 414/794.9 |
| 7,912,574 | B2 | 3/2011 | Wurman | |
| 9,725,257 | B2 * | 8/2017 | Schenning | B65G 67/08 |

(Continued)

FOREIGN PATENT DOCUMENTS

| | | |
|---|---|---|
| GB | 2353776 | 3/2001 |
| JP | 3138535 | 1/2008 |

(Continued)

*Primary Examiner* — Patrick H Mackey
(74) *Attorney, Agent, or Firm* — Van Pelt, Yi & James LLP

(57) ABSTRACT

A stack containment fixture is disclosed. The stack containment fixture includes an insertion zone structure including an insertion zone structure and a kitting area structure. The insertion zone structure includes a pair of substantially vertically oriented deflecting arms. each having one or more funnels configured to guide a stack into a position between the deflecting arms as the stack is lowered into the insertion zone structure from above. The kitting area structure is configured to support the vehicle or the stack during kitting operations for items being placed in the vehicle or stack or for items being picked from the vehicle or stack.

29 Claims, 19 Drawing Sheets

(56) References Cited

U.S. PATENT DOCUMENTS

| | | | | |
|---|---|---|---|---|
| 10,543,942 | B2 | 1/2020 | Almogy | |
| 10,676,292 | B2 * | 6/2020 | Saylor | B65B 35/22 |
| 2007/0098540 | A1 * | 5/2007 | Hendricks | B65H 31/3054<br>414/788.1 |
| 2017/0233199 | A1 | 8/2017 | King | |
| 2019/0119049 | A1 | 4/2019 | King | |
| 2022/0048707 | A1 | 2/2022 | Matl | |
| 2022/0315084 | A1 * | 10/2022 | Nishii | B62B 3/10 |

FOREIGN PATENT DOCUMENTS

| | | | |
|---|---|---|---|
| JP | 3138535 U | * | 1/2008 |
| WO | 2011071443 | | 6/2011 |
| WO | 2017021432 | | 2/2017 |

* cited by examiner

STACK CONTAINMENT STRUCTURE

CROSS REFERENCE TO OTHER APPLICATIONS

This application claims priority to U.S. Provisional Patent Application No. 63/253,048 entitled STACK CONTAINMENT STRUCTURE filed Oct. 6, 2021, which is incorporated herein by reference for all purposes.

BACKGROUND OF THE INVENTION

In certain warehouse and similar operations, a set of tasks sometimes referred to herein as "line kitting" may be performed to assemble stacked trays of items for further distribution, such as delivery to a retail point of sale. Stacks of trays containing the same type of item may be received, and trays may be drawn from different homogeneous stacks each having trays of items of a corresponding type to assemble a mixed stack of trays, e.g., to be sent to a given destination.

For example, a bakery may bake different types of products and may fill stackable trays each with a corresponding homogeneous type of product, such as a particular type of bread or other baked good. Stacks of trays may be provided by the bakery, e.g., to a distribution center. One stack may include trays holding loaves of sliced white bread, another may have trays holding loaves of whole wheat bread, still another tray holding packages of blueberry cupcakes, etc. Trays may be drawn from the various stacks to assemble a (potentially) mixed stack of trays. For example, a stack of six trays of white bread, three trays of whole wheat, and one tray of blueberry cupcakes may be assembled, e.g., for delivery to a retail store.

While the above example involves trays of different types of baked good, in other line kitting operations stackable trays may hold other products.

In a typical approach, trays are handled by human workers. The trays may include handholds to enable a human worker to grasp and move trays, e.g., by placing the workers hand on or in the handhold. Such work by human workers may cause fatigue or injuries, may take a lot of time to complete, and could be error prone.

BRIEF DESCRIPTION OF THE DRAWINGS

Various embodiments of the invention are disclosed in the following detailed description and the accompanying drawings.

DETAILED DESCRIPTION

Figure 1A:
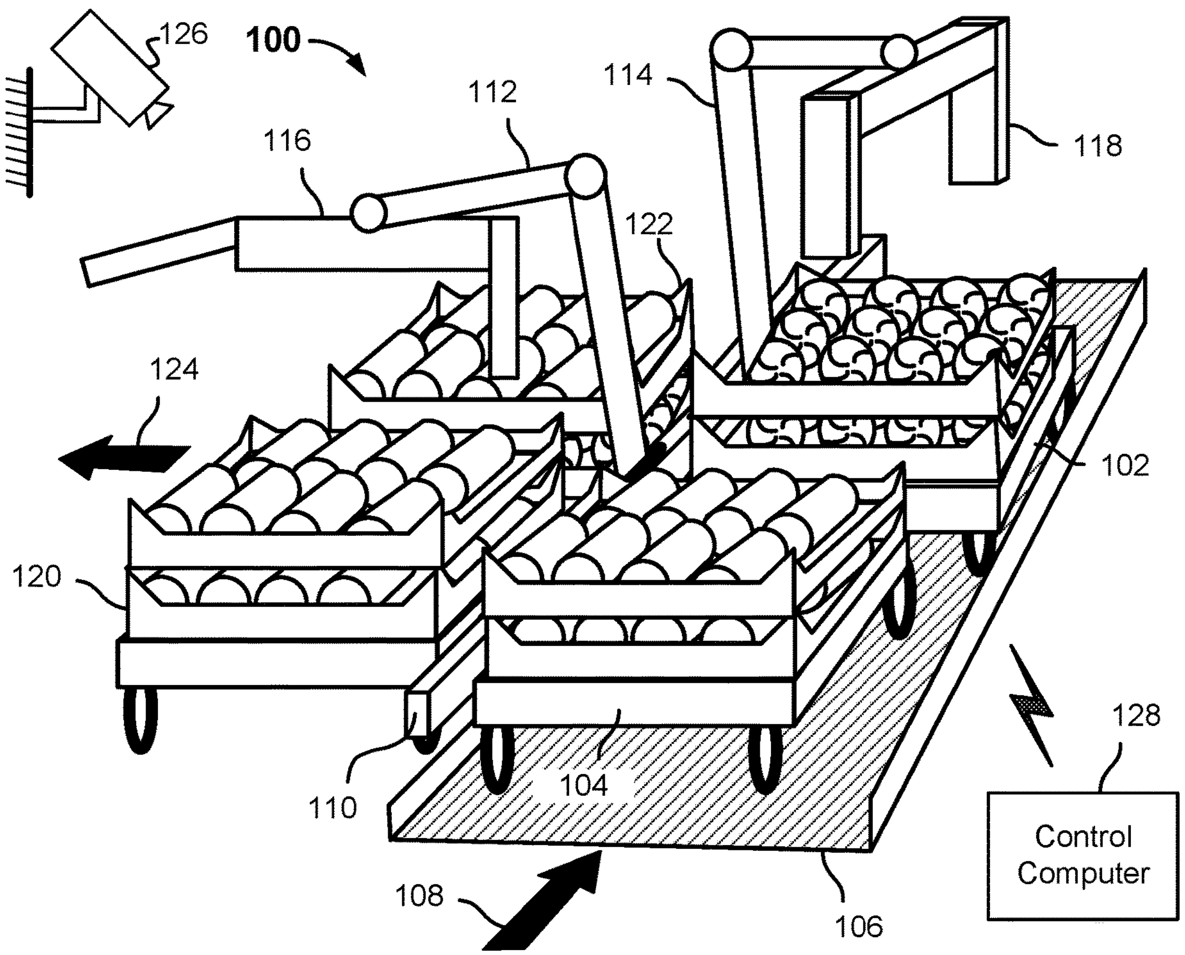
FIG. 1A is a block diagram illustrating a robotic line kitting system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A stack containment structure (also referred to as a stack containment fixture) is disclosed. According to various embodiments, the stack containment structure is configured to promote one or more of (i) ease of insertion of stacks (e.g., stacks of trays) or other vehicles to the stack containment structure, (ii) ease of placement of objects or items, such as trays, to a vehicle or stack supported in the stack containment structure, and (iii) support for a stack (or vehicle) during picking and placing operations with respect to the stack or vehicle by a robot arm.

Various embodiments include a stack containment fixture. The stack containment fixture includes an insertion zone structure that is configured to receive a vehicle or a stack, and a kitting area structure that is configured to support the vehicle or the stack during kitting operations for items being placed in the vehicle or stack or for items being picked from the vehicle or stack. In some embodiments, the stack containment fixture is included in, or deployed in connection with, a robotic system comprising a robotic arm configured to pick/place items with respect to the vehicle or stack. An example of the robotic system may be a robotic kitting system. Other types of robotic systems may be implemented, such as singulation systems, palletization systems, etc.

Various embodiments include a stack containment fixture. The stack containment fixture includes an insertion zone structure and a kitting area structure. The insertion zone structure includes a pair of substantially vertically oriented deflecting arms. each having one or more funnels configured to guide a stack into a position between the deflecting arms as the stack is lowered into the insertion zone structure from above. The kitting area structure is configured to support the vehicle or the stack during kitting operations for items being placed in the vehicle or stack or for items being picked from the vehicle or stack. In some embodiments, the deflecting arms deflect to allow stack to be pulled from insertion zone to kitting area. The deflecting arms may be configured to allow the stack to be pulled out of insertion zone in a direction opposite the kitting area. In some embodiments, the one or more funnels comprise outwardly angled tabs.

In some embodiments, robotically controlled forklifts or other robotic stack movers are configured and used to drop off stacks (or vehicles on which trays may be stacked) near enough to a robotic kitting system that the robotic kitting system is able to grasp and pull the stacks into a location from which the robotic kitting system can pick/place items from/to trays in the stack, or to place trays on the stack or vehicle. An example of a robotic stack mover is an Automated Guided Vehicle (AGV) provided by Dematic Corp.

In various embodiments, a stack containment fixture is provided to enable an AGV to drop off a stack in a first location (e.g., an insertion zone area) within the fixture. The fixture further includes structures to enable a robotic kitting system (or other robot) to pull the stack from the first location into a second location (e.g., a kitting area), and to hold the stack securely in the second location to enable the robotic kitting system (or other robot) to pick/place items from/to the trays in the stack.

In various embodiments, a stack containment fixture as disclosed herein comprises one or more of the following characteristics: (a) interfaces with AGV forklifts or other AGVs, (b) includes fins and detents which deflect within an elastic regime, (c) allow for stack/vehicle misplaces (e.g., within a positional tolerance of an AGV), (d) durable to provide a long lifespan, (e) repeatability of pull deflection (e.g., how and an extent to which fins/detents or other guiding structure deflect), (f) suitable for use in an industrial environment, (g) mounts securely (e.g., to the floor or other substrate), (h) limited pull capability of robot is sufficient to pull stacks/vehicles through the fixture (e.g., from the insertion zone area to the kitting area), (i) limited reach of robot is sufficient to pull stacks/vehicles through the fixture, (j) allows for human removal of stacks/vehicles (e.g., pulling the stack out of the fixture, lifting the stack up from the fixture, etc.), and (k) ensures safety (e.g., to avoid injury to humans or product).

In various embodiments, a robotic system as disclosed herein is configured to pick from stationary stacks of trays (or other receptacles) which sit upon dollies. An example of such a robotic system is disclosed in U.S. patent application Publication Ser. No. 16/797,359, filed Feb. 21, 2022, published on Aug. 27, 2020, as U.S. Publication No. 2020/0269429, the entire contents of which are incorporated herein by reference for all purposes.

Although embodiments described herein are provided in the context of a kitting system or picking and placing items from a tray, various embodiments may be implemented in various other contexts such as palletizing systems, singulation systems, etc.

As used herein, depalletization includes picking an item from a pallet, such as from a stack of items on the pallet, moving the item, and placing the item at a destination location such as a conveyance structure. An example palletization/depalletization system and/or process for palletizing/de-palletizing a set of items is further described in U.S. patent application Ser. No. 17/343,609, the entirety of which is hereby incorporated herein for all purposes.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. An example of singulation system and/or process for singulating a set of items is further described in U.S. patent application Ser. No. 17/246,356, the entirety of which is hereby incorporated herein for all purposes.

As used herein, kitting includes the picking of one or more items/objects from corresponding locations and placing the one or more items in a predetermined location in a manner that a set of the one or more items correspond to a kit. An example of a kitting system and/or process for kitting a set of items is further described in U.S. patent application Ser. No. 17/219,503, the entirety of which is hereby incorporated herein for all purposes.

FIG. 1A is a block diagram illustrating a robotic line kitting system. In the example shown, system 100 includes source tray stacks 102 and 104 moving along an input stack conveyance (e.g., conveyance 106) fed in this example from an input end 108 (staging and loading area). Each of the source tray stacks 102 and 104 in this example is shown to be stacked on a wheeled cart, dolly, chassis, or other vehicle. In various embodiments, the source tray stacks 102 and 104 may be pushed manually onto the conveyance 106, which may be a conveyor belt or other structure configured to advance the source tray stacks 102 and 104 through the workspace defined by conveyance 106. In various embodiments, the source tray stacks 102 and 104 may be pushed/pulled onto the conveyance 106 by a robotic arm (e.g., robotic arm 112 or 114), such as a robotic arm being controlled in a third mode in which a multi-mode end effector is used to push/pull a stack of trays. In some embodiments, the chassis or other base structure on which the source trays are stacked may be self-propelled. In some embodiments, source tray stacks 102 and 104 may be advanced through/by conveyance 106 under robotic control. For example, the speed and times at which the source tray stacks 102 and 104 are advanced by/through conveyance 106 may be controlled to facilitate efficient grasping of trays from the source tray stacks 102 and 104.

In the example shown, a single rail (e.g., rail 110) is disposed along one long side of the conveyance 106. In this example, two robots, one comprising robotic arm 112 and another comprising robotic arm 114, are mounted movably, independent of one another, on rail 110. For example, each robotic arm 112, 114 may be mounted on a self-propelled chassis that rides along rail 110. In this example, each robotic arm 112, 114 terminates with a tray handling end effector (e.g., end effector 116, 118). In some embodiments, end effector 116 and/or 118 implements end effector 300 of FIGS. 3A-3C.

In various embodiments, the tray handling end effector (e.g., end effector 116 or 118) is operated under robotic control to grasp one or more trays from a source tray stack 102, 104. In some embodiments, the tray handling end effector is comprised in a multi-mode end effector attached to robotic arm 112, 114. Examples of a multi-mode end effector include end effector 300 of FIGS. 3A-3C. The tray handling end effector my correspond to a second grasping mechanism of the multi-mode end effector. For example, the tray handling end effector comprises a plurality of gripper arms, at least a subset of which are movable to adjust a grip of a tray being picked/placed. In some embodiments, the multi-mode end effector further comprises a first grasping mechanism configured to pick and place smaller items, such as items comprised in the one or more trays moved by the tray handling end effector. As shown in FIG. 1A, each end effector 116, 118 includes a lateral member attached to the end of the robotic arm 112, 114. A side member is mounted on each end of the lateral member. As shown, at least one of the side members is opened or closed under robotic control, in various embodiments, to enable a tray to be grasped (by closing the side member) or released (by opening the side member). In some embodiments, the at least one side member that is opened or controlled under robotic control is configured to rotate around an axis perpendicular to the axis of the length of the lateral member. In some embodiments, the at least one side member that is opened or controlled under robotic control is configured to move along, or substantially along/parallel with, the axis of the length of the lateral member. Various other end effectors may be implemented.

As used herein, a first grasping mechanism may include a suction-based end effector or other grasping mechanism. In some embodiments, the suction-based end effector comprises a plurality of suction cups. The plurality of suction cups may be controlled collectively, or a subset of the plurality of suction cups may be controlled independent of another subset of the plurality of suction cups. In some embodiments, the suction-based end effector is robotically controlled to pick one or more items from, or place one or more items in, a tray or other receptacle within a workspace of a robot.

As used herein, a second grasping mechanism may include an end effector comprising a plurality of gripper arms that picks up a tray (or other item or receptacle) by gripping the sides or bottom of the tray. In some embodiments, one or more gripper arms of the second grasping mechanism are movable with respect to a mount to which the end effector is connected to a robotic arm. As an example, the one or more movable gripper arms may be robotically controlled to close a grip on the tray (e.g., in connection with picking up the tray) or to open a grip with respect to the tray (e.g., in connection with releasing the tray at a destination location). For example, the second grasping mechanism may include an active arm and a passive arm, and the active arm may be robotically controlled to adjust the grip/release of a tray.

In various embodiments, each tray handling end effector 116, 118 (e.g., the second grasping mechanism of the multi-mode end effector) includes one non-moving ("passive") side member and one movable ("active") side member. In this example, the movable or "active" side member swings open (position in which end effector 116 is shown), e.g., to enable the end effector to be placed in position to grasp one or more trays, and swings closed (position in which end effector 118 is shown), e.g., to complete a grasp of one or more trays. In other examples, the movable or "active" side member is moved in a lateral translation substantially parallel with the length of a lateral member of the multi-mode end effector from which the "active" and "passive" side members are connected or otherwise extend. In other words, the "active" side member is moved in direction substantially corresponding to the axis of the lateral member in order to widen the grip of the second grasping mechanism or to shorten the grip of the second grasping mechanism when applying a force on a tray to be picked/placed. In various embodiments, a robotic control system (e.g., a computer that controls robotic arms 112, 114, such as control computer 128) controls the end effector to actuate the opening/closing of the end effector such as in connection with grasping or releasing a tray. The robotic control system controls the end effector based at least in part on image data of the workspace and/or one or more sensors comprised in (or connected to) the corresponding end effector. In some embodiments, the one or more sensors one or more sensors comprised in (or connected to) the corresponding end effector are configured to: (i) obtain information indicative of whether a grasping mechanism (e.g., an active member of the second grasping mechanism) of the multi-mode effector is in an open position or a closed position, (ii) obtain information indicative of an extent to which the grasping mechanism is open, (iii) obtain information indicative of when the tray (or end effector relative to the tray) is in a position at which the multi-mode end effector is controlled to engage at least one side of the multi-mode end effector (e.g., a passive member or a structure comprised on the passive member) with a hole, a recess, or the a comprised in a side of a tray (e.g., a tray being grasped), (iv) obtain information indicative of when the tray (or end effector relative to the tray) is in a position at which the multi-mode end effector (e.g., a passive member or a structure comprised on the passive member) is engaged with the hole, the recess, or the handle comprised in the a side of a tray, (v) obtain information indicative of whether the grasping mechanism is closed or otherwise engaged with the tray, (vi) obtain information indicative of whether the second grasping mechanism is in an inactive state or an active state, (vii) obtain information indicative of whether an item is grasped by the first grasping mechanism (e.g., the suction-based end effector) of the multi-mode end effector, (viii) obtain information indicative of an attribute of the first grasping mechanism (e.g., a pressure between the suction-based end effector and the item being grasped), (ix) an indication of whether the first grasping mechanism is engaged with an object, (x)

obtain information indicative of a state of the first grasping mechanism (e.g., information indicative of the state of the suction cups, such as a position of the suction cups in the case that relative positions of the suction cups can be changed to widen or shorten a distance between at least two suction cups, etc.).

In various embodiments, each end effector 116, 118 includes on each side member one or more protrusions or similar structures of a size and shape such that the protrusion, etc., fits into and, in various embodiments, can be slid under robotic control into holes or other openings in the sides the tray(s) to be grasped. For example, in some embodiments, protrusions on the inner face of the side members, sometimes called "thumbs" herein, may be slotted into handholds (e.g., holes sized to accommodate a human hand) on opposite sides of a tray, as described and illustrated more fully below.

In various embodiments, the respective robotic arms 112, 114 are operated at the same time, fully autonomously, to pick trays from source tray stacks 102, 104 and place them on destination tray stacks, such as destination tray stacks 120, 122, in a destination tray stack assembly area on an opposite side of rail 110 from conveyance 106 and source tray stacks 102, 104. The destination tray stacks may be assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective source tray stacks 102, 104 and stacking them on a corresponding destination tray stack 120, 122. Completed destination tray stacks 120, 122 may be removed from the destination tray stack assembly area, as indicated by arrow 124, e.g., to be place on trucks, rail cars, containers, etc. for delivery to a further destination, such as a retail store.

Referring further to FIG. 1A, in the example shown in the system 100 includes a control computer 128 configured to communicate wirelessly with robotic elements comprising system 100, including in various embodiments one of more of conveyance 106; the wheeled chassis on which source tray stacks 102, 104 are stacked (if self-propelled); the robotic arms 112, 114 and/or the respective chassis on which the robotic arms 112, 114 are mounted on rail 110; and the robotically controlled tray handling end effectors (e.g., end effectors 116, 118). In various embodiments, the robotic elements are controlled by control computer 128 based on input data, such invoice, order, and/or manifest information, as well as input state information, such inventory data indicating which source tray stacks include which type and/or quantity of product.

In various embodiments, source tray stacks 102, 104 may be inserted into a gate or other ingress/control structure at the input end 108 of conveyance 106. Conveyance 106 may comprise an apparatus (stack mover) that moves the source tray stacks 102, 104 along the rail 110 to optimize throughput and minimize robot displacement, e.g., by minimizing how far and/or often the robotic arms 112, 114 must be moved along rail 110 to grasp source trays and place them on respective destination stacks. The source tray stacks 102, 104 can come in with trays in different orientations/weights/ and weight distribution. The system 100 uses force and moment control to operate robotic arms 112, 114 to insert a thumb or other protrusion gently and securely into a tray and plans its motion and tray trajectory in order to not collide with itself or the environment. In various embodiments, each robotic arm 112, 114 operates in a very tight space of roughly 2.5 m in width and has a very light footprint. The robot utilizes its full workspace and intelligently plans its motion optimizing its grasp. The robot recognizes the need to perform orientation changes and handles that accordingly while avoiding obstacles. The robot moves to the correct output (e.g., destination tray stack 120, 122) corresponding to the right customer while coordinating with the other robots on the rail 110. The robot then uses advanced force control and interactions with the environment to figure out a proper place strategy. The cycle then restarts.

In the example shown in FIG. 1A, the system 100 includes a 3D camera 126. In various embodiments, the system 100 may include a plurality of 3D (or other) cameras, such as camera 126, and may use image and depth data generated by such cameras to generate a three-dimensional view of at least relevant portions of the workspace and scene, such as the scene/state shown in FIG. 1A. In some embodiments, cameras such as camera 126 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by cameras such as camera 126 is used to move robotic arms and end effectors into a position near a tray or stack of two or more trays to be grasped and picked up from a source stack and/or to position the tray(s) near a destination at which they are to be place, e.g., at the top of a corresponding destination stack. In some embodiments, force control is used, as described more fully below, to complete the final phases of a pick/grasp episode and/or a placement episode.

Although a single camera (e.g., camera 126) mounted to a wall in the workspace of system 100 is shown in FIG. 1A, in various embodiments, multiple cameras or other sensors, or a combination thereof, may be mounted statically in a workspace. In addition, or instead, one or more cameras or other sensors may be mounted on or near each robotic arm 112, 114, such as on the arm itself and/or on the end effector 116, 118, and/or on a structure that travels with the robotic arm 112, 114 as it is moved along rail 110.

Figure 1B:
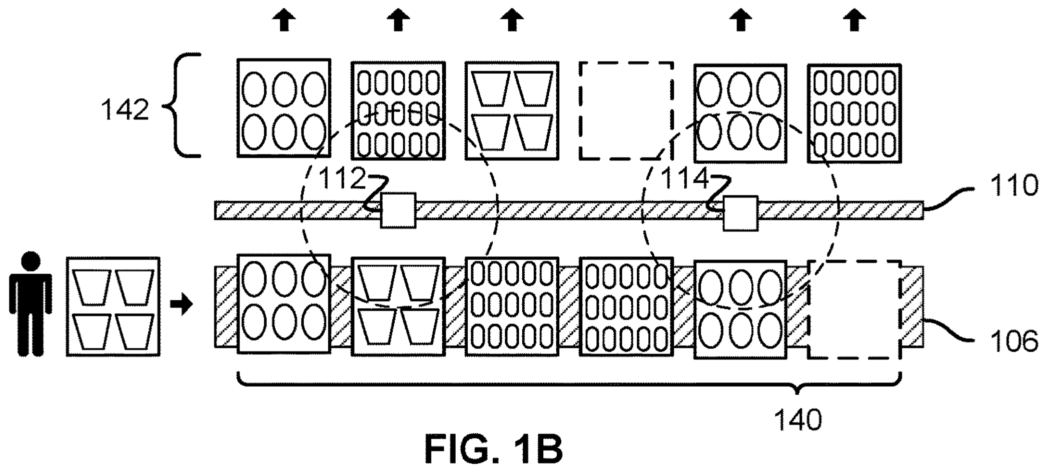
FIG. 1B is a block diagram illustrating a robotic line kitting system.

FIG. 1B is a block diagram illustrating a robotic line kitting system according to related art. In FIG. 1B, an example is shown of an overhead view of a workspace in which the system 100 of FIG. 1A may operate. In the example shown, robotic arms 112, 114 move along a common rail (e.g., rail 110), as in FIG. 1A, to access and pick trays from source stacks 140 moving along conveyance 106 and play trays on corresponding destination stacks 142 in the destination stack assembly area on the opposite side of rail 110 from the source stacks 140 and conveyance 106. In this example, a human worker manually feeds source stacks onto the conveyance 106, but in some embodiments a robotic worker performs all or part of that task, e.g., according to plan generated programmatically to fulfill a set of orders, each associated with a corresponding destination. As destinations stacks 142 are completed, they are moved out of the destination stack assembly area, as indicated by the arrows that the top of FIG. 1B, which corresponding to arrow 124 of FIG. 1A.

While in the example shown in FIGS. 1A and 1B the trays each contain only one type of time, in other embodiments and applications source and destination trays having mixes of items may be handled to assemble destination stacks of trays as disclosed herein. Similarly, while in the example shown in FIGS. 1A and 1B the source stacks of trays each contain only trays of the same type and content, in other embodiments and applications source tray stacks may include a mix of trays and/or item types. For example, the control computer 128 may be provided with information indicating which types of tray are in which position in each source tray stack, and may use that information, along with manifest or other information indicating the required contents of each destination tray stack, to build the required destination tray stacks by picking needed trays each from a corresponding position on a source tray stack and adding the tray to a corresponding destination stack.

Figure 2:
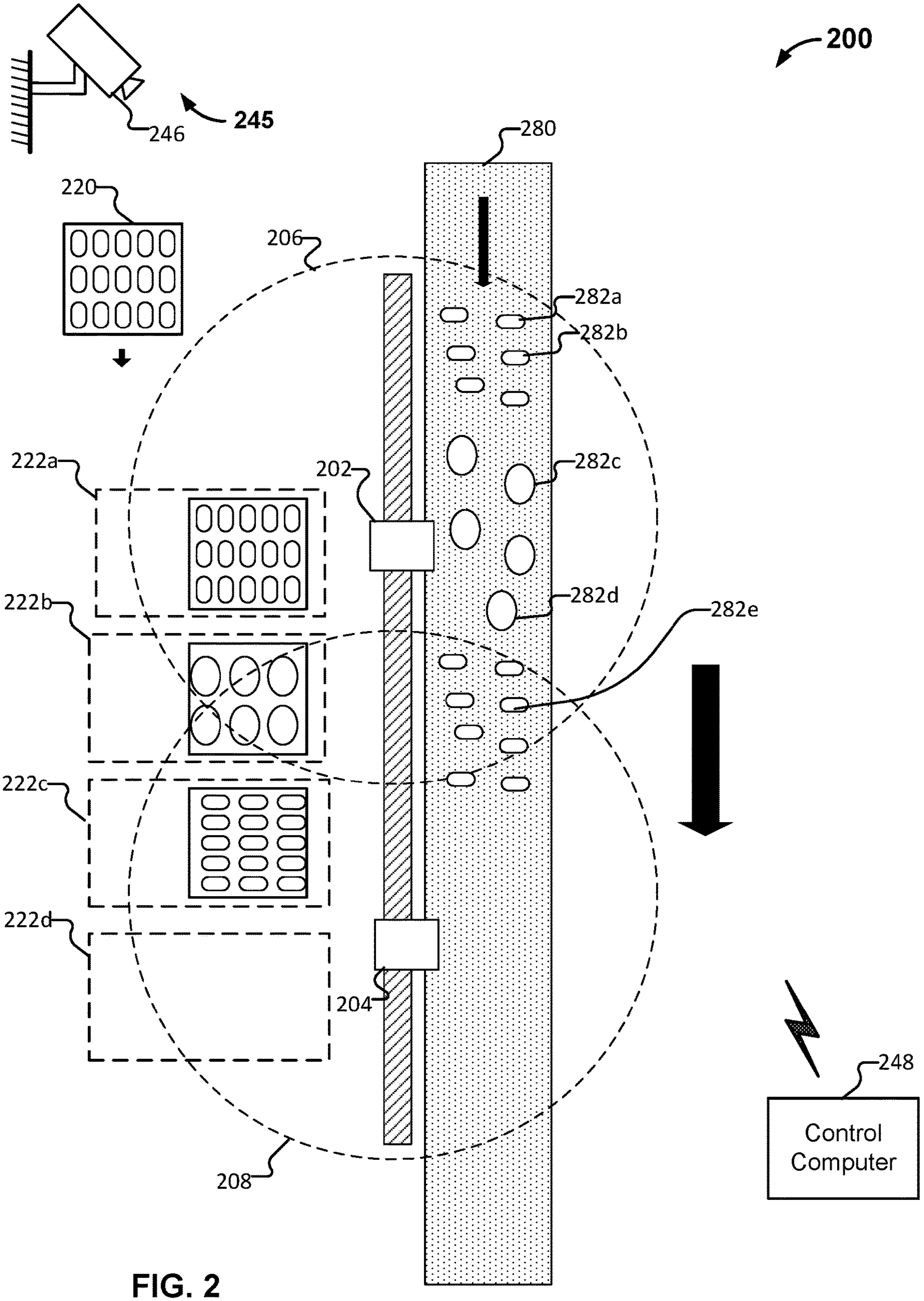
FIG. 2 is a block diagram illustrating a robotic line kitting system according to various embodiments.

FIG. 2 is a block diagram illustrating a robotic line kitting system according to various embodiments. In the example shown in FIG. 2, system 200 comprises robotic stack a conveyance structure 280 disposed in proximity to robot arms 202, 204 to carry items or trays to/from the workspace. Conveyance structure 180 and stacks/vehicles with respect to which robot arms 202, 204 perform pick/place operations may be located on opposing sides of the rail along which robot arms 202, 204 traverse. In various embodiments, robot arms 202, 204 are controlled to perform kitting operations with respect to tray stacks.

According to various embodiments, one or more stack containment structures (e.g., stack containment fixtures) are disposed in proximity to robot arms 202, 204 (or the rail along which robot arms 202, 204 traverse). The stack containment structures may provide support for tray stacks while the robot performs picks/places items or objects from/to the tray stacks (e.g., a topmost tray in the tray stacks). In the example shown, system 200 comprises stack containment structures 222*a*, 222*b*, 222*c*, and 222*d*. As illustrated in FIG. 2, stack containment structures 222*a*, 222*b*, and 222*c* comprise tray stacks of trays comprising items. Stack containment structures 222*a*, 222*b*, 222*c*, and 222*d* are disposed close enough to the rail along which robot arms 202, 204 traverse that at least one of robot arm 202, 204 is able to pull a tray from an insertion zone area of the corresponding stack containment structure to a kitting area of the stack containment structure. For example, stack containment structures 222*a*, 222*b*, 222*c*, and/or 222*d* are partly or completely within range 206 of robot 202 or range 208 of robot 204.

The insertion zone area of the stack containment structure may correspond to an area at which a stack(s) (e.g., a tray stack) is introduced to the stack containment structure. For example, an AGV operating within a warehouse, etc. moves a tray stack (e.g., a vehicle comprising the tray stack, etc.) towards stack containment structure and introduces the tray stack to the insertion zone of the stack containment structure.

The kitting area of the stack containment structure may correspond to an area at which a stack(s) (e.g., a tray stack) is supported while robot arms 202, 204 are operated to pick/place items to the stack(s). For example, the stack containment structure is configured to provide sufficient support to the stack(s) to restrict (e.g., limit, minimize, or eliminate, etc.) movement or vibrations of the stack during the picking/placement of items from/to the stack(s).

In the example shown, stack containment structures 222*a*, 222*b*, 222*c* respectively comprise tray stacks. In some embodiments, robot arms 202, 204 are controlled to load or unload the tray stacks. For example, robot arms 202, 204 are controlled to pick objects (e.g., objects such as 282*a*, 282*b*, 282*c*, 282*d*, or 282*e*) from conveyance structure 280 and place the objects on tray stacks at stack containment structures 222*a*, 222*b*, 222*c*. As another example, robot arms 202, 204 are controlled to pick objects from tray stacks at stack containment structures 222*a*, 222*b*, 222*c* and place the objects on conveyance structure 180, which carries the objects to a corresponding destination location.

Although in the examples shown in FIGS. 1A, 1B, and 2 the trays each contain only one type of object, in various embodiments and applications source and destination trays having mixes of items may be handled to assemble destination stacks of trays as disclosed herein. Similarly, although in the examples shown in FIGS. 1A, 1B, and 2 the source stacks of trays each contain only trays of the same type and content, in other embodiments and applications source tray stacks may include a mix of trays and/or item types. For example, the control computer 248 may be provided with information indicating which types of trays are in which position in each source tray stack, and may use that information, along with manifest or other information indicating the required contents of each destination tray stack, to build the required destination tray stacks by picking needed trays each from a corresponding position on a source tray stack and adding the tray to a corresponding destination stack.

According to various embodiments, a system combining (e.g., comprising both) an AGV, stack containment structures, and robot arms enables the system to automatically process a set of vehicles (e.g., tray stacks tray stacks at stack containment structures 222*a*, 222*b*, 222*c* tray stacks at stack containment structures 222*a*, 222*b*, 222*c*). System 200 may detect when a stack/vehicle is to be processed, such as based on a determination that a stack/vehicle has been inserted into a stack containment structure 222*a*, 222*b*, 222*c*, or 222*d*. In response to detecting that a stack/vehicle is to be processed, system 200 may control robot arm 202, 204 to perform pick or place operations (e.g., pick items from a tray, place items to a tray) with respect to the stack/vehicle. System 200 may determine when processing of a stack/vehicle is complete, such as determining that a tray stack has been loaded or emptied, as applicable. In response to determining that the processing of the stack/vehicle is complete, system 200 determines that stack/vehicle may be removed from the applicable stack containment structure 222*a*, 222*b*, 222*c*, or 222*d*. In response to determining that the stack/vehicle is to be removed from the applicable stack containment structure 222*a*, 222*b*, 222*c*, or 222*d*, system 200 may control to remove the stack/vehicle, such as by robotically removing the stack/vehicle based on operating an AGV or other robot, or by providing to a user (e.g., via a user interface on a computer system) an indication that the stack/vehicle is ready for removal.

In some embodiments, in response to determining that the processing of the stack/vehicle is complete, system 200 controls to move the stack/vehicle from a kitting area of the corresponding stack containment structure to an insertion zone area of the stack containment structure (e.g., for removal therefrom such as by an AGV or human, etc.).

The system may iterate over the moving stacks/vehicles to the workspace using the robotic stack mover (e.g., an AGV or other robot), and inputting new stacks/vehicles to the workspace (e.g., to the insertion zone of the stack containment structure) using the robotic stack mover, controlling a robot to process the stacks/vehicles (e.g., perform pick/place operations of items to/from the stacks/vehicles) until no further stacks/vehicles are to be processed.

In the example shown, system 200 comprises vision system 245. In various embodiments, vision system 245 obtains the information associated with the workspace of robot arm 202, robot arm 204, workspace of system 200, conveyor 280, and/or stack containment structure(s) 222*a*, 222*b*, 222*c*, and/or 222*d*. Vision system 245 obtains the information associated with the workspace based at least in part on data obtained by one or more sensors (e.g., an image system such as a 2D/3D camera, a laser sensor, an infrared sensor, a sensor array, a weight sensor, etc.). As an example, as illustrated in FIG. 2, vision system 145 includes a camera 246. Various other types of sensors may be implemented in connection with vision system 245. In various embodiments, system 200 may include a plurality of 3D (or other) cameras, such as camera 246, and may use image and depth data generated by such cameras to generate a three-dimensional view of at least relevant portions of the workspace and scene, such as the scene/state shown in FIG. 2. In some embodiments, cameras such as camera 246 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

System 200 (e.g., control computer 248) may control robot arm 202, 204 to pick/place items from/to tray stacks, or pick/place trays from/to the tray stack. For example, in response to filling a tray on a tray stack, system 200 may control robot arm 202, 204 to retrieve an empty tray and place the empty tray on top of the tray stack (e.g., on top of the full tray). As another example, in response to emptying a tray on a tray stack (e.g., a topmost tray), system 200 may control robot arm 202, 204 to pick the tray from the tray stack and place the tray in a tray return location. In various embodiments, image data generated by vision system 245 such as camera 246 is used to move robot arms and end effectors into a position near a tray or stack of two or more trays comprising items to perform the pick/place operations, including using force control to grasp items or trays.

Although a single camera (e.g., camera 246) mounted to a wall in the workspace of system 200 is shown in FIG. 2, in various embodiments, multiple cameras or other sensors, or a combination thereof, may be mounted statically in a workspace. In addition, or instead, one or more cameras or other sensors may be mounted on or near each robot arm 202, 204, such as on the arm itself, and/or on the end effector of the corresponding robot arm, and/or on a structure that travels with the robot arm 202, 204 as it is moved along rail.

Figure 3A:
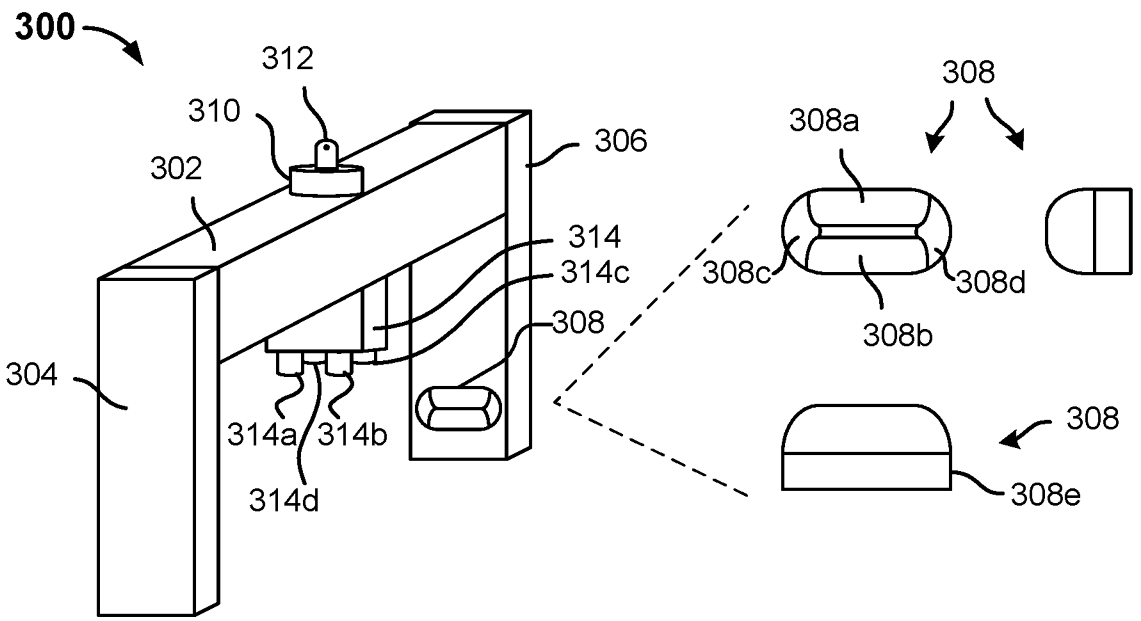
FIG. 3A is a block diagram illustrating a robotic end effector configured to perform kitting operations according to various embodiments.

FIG. 3A is a block diagram illustrating a robotic end effector configured to perform kitting operations according to various embodiments. In some embodiments, end effector 300 is implemented in connection with system 100 of FIG. 1A such as by robot arms 112, 114, and/or system 200 of FIG. 2 such as by robot arms 202, 204. End effector 300 is a multi-mode end effector comprising at least two grasping mechanisms (e.g., a first grasping mechanism and a second grasping mechanism). In some embodiments, end effector 300 is robotically controlled to operate according to different modes, such as based on a task to be performed. For example, end effector 300 may operate in a first mode in which a first grasping mechanism (e.g., a suction-based end effector is used to pick/place an item). As another example, end effector 300 may operate in a second mode in which a second grasping mechanism (e.g., an end effector having gripper arms is used to pick/place a tray). As another example, end effector 300 may operate in a third mode in which a structure on end effector 300 is used to push/pull a tray or a stack of trays.

In the example shown, end effector 300 includes a plurality of grasping mechanisms. In some embodiments, end effector 300 comprises (i) a first grasping mechanism corresponding to a suction-based end effector 314, and (ii) a second grasping mechanism comprising gripper arms (e.g., side members). The different grasping mechanisms comprised in end effector 300 may be used for different functions or in different modes. Suction-based end effector 314 comprises one or more suction cups 314*a*, 314*b*, 314*c*, and 314*d*. In some embodiments, end effector 300 is robotically controlled to grasp objects (e.g., trays, items in trays, etc.) based on selectively controlling one or more of the first grasping mechanism and the second grasping mechanism.

As illustrated in FIG. 3A, end effector 300 comprises a lateral member 302 to the first grasping mechanism and/or a plurality of elements for the second grasping mechanism are mounted. For example, end effector 300 comprises lateral member 302 which a side member 304 is fixedly mounted and a side member 306 is hinge or otherwise movably mounted in a manner that enables side member 306 (e.g., active side member) to be moved to an open position that facilitates moving the end effector 300 into a position to grasp a tray. An active side thumb 308 is positioned on (or comprises an integral part or feature of) an inner face of side member 306. In some embodiments, both gripper arms (e.g., side members) are movable with respect to lateral member 302 such as in connection with extending or shortening a grip between the gripper arms.

According to various embodiments, side member 306 is movable within a predefined range of motion. As an example, end effector 300 includes one or more stopping mechanisms (e.g., stopper, switch, or the like, or a combination thereof) that restrict movement of the side member 306 to within the predefined range of motion. End effector 300 may include an open position stopping mechanism that prevents side member 306 from moving in an opening direction past an open position threshold (e.g., 130 degrees relative to a plane/vector along which lateral member 302 extends in a lengthwise direction, or between 30 and 50 degrees relative to a closed position at which active member 306 is substantially normal to the plane/vector along which lateral member 302 extends). End effector 300 may include a closed position stopping mechanism that prevents side member 306 from moving in an closing direction past a closed position threshold (e.g., about 90 degrees relative to a plane/vector along which lateral member 302 extends in a lengthwise direction, etc.). Various values can be selected for the open position threshold and/or the closed position threshold. In some embodiments, the open position threshold is set based at least in part on an environment in which the robot to which end effector 300 is connected operates. As an example, if a plurality of robots is operating within a relatively close proximity to each other, the range of motion of the side member 306 is based at least in part on a distance between robots or between zones in which the various robots (e.g., neighboring robots) operate. As the side member 306 moves from a closed position to an open position the further the side member 306 extends in the x-direction. In addition, the further the side member 306 is movable from the closed position to the open position, the greater the time required for the robotic system to control to open/close side member 306 in connection with grasping/placing a tray(s). Accordingly, limiting the range of motion of the side member 306 (e.g., to a sufficient open position threshold to permit the end effector to grasp a set of one or more tray(s) with ease) allows the robotic system to operate more efficiently within proximity of other robots (e.g., other robots that are autonomously grasping, moving, and placing trays).

In some embodiments, the open position threshold and/or the closed position threshold are configurable. For example, the one or more stopping mechanisms are configurable and set based on the desired the open position threshold and/or the closed position threshold configuration(s).

The active side thumb 308 and a corresponding structure on the inner face of side member 304, not visible in FIG. 3A, are of a size and shape suitable to be inserted into a handhold or other recess or hole on opposite sides of a tray to be grasped by the end effector 300. In various embodiments, the thumbs 308 are removable and replaceable, e.g., to be replaced once they are worn out from use or to be exchanged with a thumb having a different shape, dimensions, materials, etc. suitable to grasp a different type of tray, for example. Active side thumb 308 is fixedly mounted to side member 306 such as to impede thumb 308 from rotating (e.g., during engagement with tray handle, etc.). For example, active side thumb is mounted to side member 306 at three mounting points. Various other mounting configurations or number of mounting points may be implemented. As shown in the three-view drawing to the right of FIG. 3A, in the example shown the thumb 308 has convex surfaces 308*a-d* on each of four sides. In various embodiments, the convex surfaces 308*a-d* facilitate using force and moment control to insert the thumb 308 into a handle or other hole or recess in the side of a tray to be grasped. In some embodiments, the convex surfaces are used in conjunction with active force control and orientation impedance control to ensure a gentle and secure final grasp, where the active side is fully into the tray. For example, even if imperfectly aligned, a convex surface 308*a-d* engaged in a side or edge of a hole may enable the rest of the thumb 308 to more readily be slid more fully into the hole. Flat surfaces 308*e* at the base of the thumb, nearest the inner side wall of the side member 304, 306 on which the thumb 308 is mounted, in various embodiments enable misalignment to between the end effector 300 and the tray(s) being grasped to be corrected and/or alignment refined. For example, in a picking episode, a thumb of the side member 304 (e.g., the passive side member) may be moved into position near a handle or other hole on one side of the tray to be grasped. The convex surfaces 308*a-d* may be used, under force control, to slide the thumb partway into the hole. The flat surfaces 308*e* near the base of the thumb may be used to better align the passive side with the tray prior to closing the side member 306.

Referring further to FIG. 3A, in the example shown end effector 300 includes a force sensor 310 mounted on lateral member 302 and a bracket 312 to attach the end effector 300 to a robotic arm. In some embodiments, end effector 300 may be attached to a robotic arm via a pin inserted through a hole in bracket 312, enabling the end effector 300 to swing freely and/or be rotated under robotic control, e.g., using one or more motors, about a longitudinal axis of the pin. In various embodiments, force sensor 310 detects forces/moments experienced by end effector 300 in an x, y, and/or z direction. Force sensor 310 may have a single axis overload of force in the x or y direction (e.g., $F_{xy}$) of at least ±10000 N and/or a single axis overload of force in the z direction of at least ±30000 N (e.g., $F_z$). Force sensor 310 may have a single axis overload of torque in the x or y direction (e.g., $T_{xy}$) of at least ±1000 Nm and/or a single axis overload of torque in the z direction of up to at least ±1000 Nm (e.g., $T_z$). In some embodiments, force sensor 310 has a single axis overload of force in the x or y direction (e.g., $F_{xy}$) of about ±18000 N and/or a single axis overload of force in the z direction of about ±48000 N (e.g., $F_z$); and a single axis overload of torque in the x or y direction (e.g., $T_{xy}$) of about ±1700 Nm and/or a single axis overload of torque in the z direction of about ±1900 Nm (e.g., $T_z$).

In various embodiments, side member 304 is fixedly mounted to lateral member 302. The fixed mounting of the side member 304 may enable forces and moments acting on end effector 300 (e.g., on side member 304) to propagate through the frame of the end effector (e.g., lateral member 302 and side member 304) to force sensor 310. For example, the fixed mounting of the side member 304 avoids forces and movements from translating into a movement of other parts of the end effector such as active member 306 when active member 306 is being actuated to move thumb 308 to engage with a tray handle (e.g., to insert thumb 308 into the tray handle).

Figure 3B:
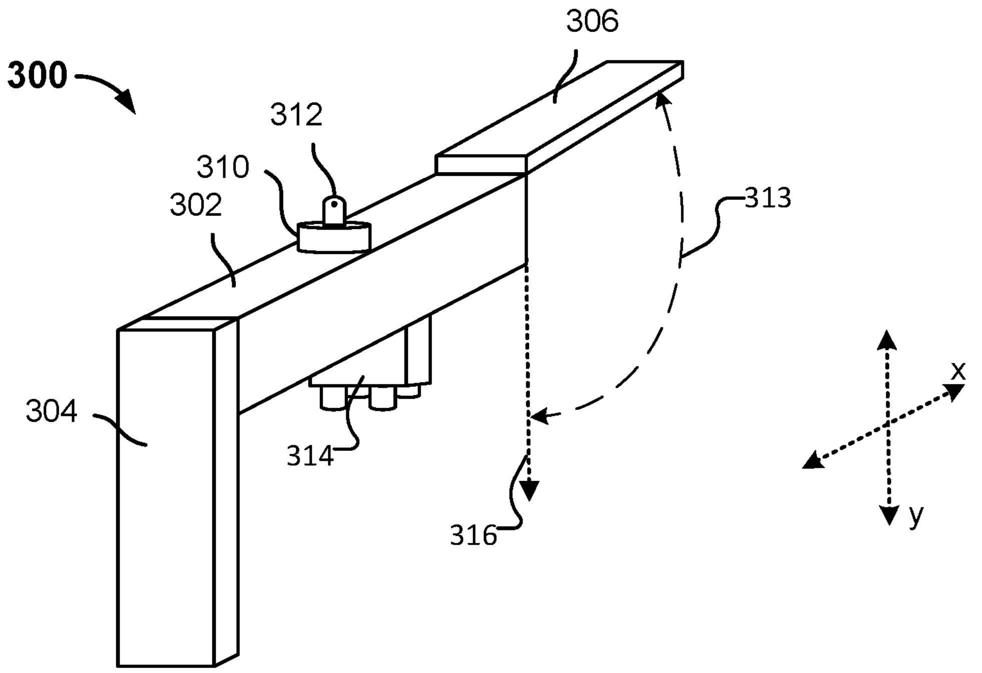
FIG. 3B is a block diagram illustrating a robotic end effector configured to perform kitting operations according to various embodiments.

FIG. 3B is a block diagram illustrating a robotic end effector configured to perform kitting operations according to various embodiments. End effector 300 comprises a second grasping mechanism that is controlled (e.g., during the second mode of operation of the multi-mode operation) to grasp items using gripper arms (e.g., side members 304, 306). In some embodiments, end effector 300 is controlled to move one or more of the gripper arms to open a grip to allow end effector 300 to move into position to grasp an object (e.g., a tray) and to move one or more of the gripper arms to close the grip on the object to be grasped.

In the state shown in FIG. 3B, the active side member 306 has been opened to the open position, e.g., by a pneumatic or hydraulic piston, motor, or other motive force and structure housed in lateral member 302 (not shown) in FIG. 3B. Vector/direction 316 illustrates an example of a closed position (e.g., the closed position threshold). In various embodiments, the closed position is a configuration according to which side member 306 forms a normal vector relative to lateral member 302. For example, the closed position threshold is 90 degrees (or substantially 90 degrees) relative to a direction along which lateral member 302 extends. As illustrated in FIG. 3B, side member 306 is moved to an open position. As side member 306 is moved to the open position, an angle between side member 306 and vector/direction 316 is represented as angle 313. According to various embodiments, the open position threshold corresponds to a configuration at which angle 313 is between 35 degrees and 50 degrees. In some embodiments, open position threshold corresponds to a configuration at which angle 313 is between 40 degrees and 50 degrees. In some embodiments, open position threshold corresponds to a configuration at which angle 313 is between about 40 degrees and about 45 degrees.

In various embodiments, robotic system controls side member 306 (e.g., controls an actuation device to move side member 306) based at least in part on information obtained by one or more sensors, such as a sensor(s) comprised in side member 306 (e.g., thumb 308 of side member 306), a sensor(s) comprised in side member 304 (e.g., a thumb of passive side member), a camera or other sensor comprised on or around the robot to which end effector 300 is connected (e.g., to capture information pertaining to the workspace of the robot), and the like, or any combination thereof. Side member 306 is controlled according to a plan to grasp, move, and/or place a set of one or more trays and the information obtained from the one or more sensors. Side member 306 may be further controlled according to obstacles within the workspace of the robot such as another stack of trays (e.g., an adjacent stack), another robot working to remove a tray another stack of trays (or of the same tray).

In various embodiments, tray pick operations as disclosed herein are smooth, gentle, and precise and are tolerant to uncertainty and disturbances. In various embodiments, a pick episode using the second grasping mechanism (e.g., grasping a tray using gripper arms) includes one or more of:

Lowering to a target pose (adjacent tray) from the hover pose (above stack) coupled with height checks to refine estimation of where the tray handle is and a dynamic goal adjustment.

Using the active side surface of the end effector to control any uncertainties in the direction of the rail be it a misplaced tray or a human error. In various embodiments, after moving to the hover pose, the robot lowers into the position to align with the handle, and while it does this lowering motion, force control is used to ensure that the alignment in the rail direction is perfect (or substantially perfect). This can be very likely because the gripper almost perfectly fits the length of the tray in between itself, and any misalignment can lead to contact. This contact is ensured to be on the active side panel, which has a diagonal plane—meaning that the robotic system can effectively use the contact between the gripper and the misaligned trays to adjust our position using force control.

Proceeding to use a three degree of freedom (3 DOF) force controller (e.g., based on sensor readings from force sensor 310) to find the position of the (tray handle) slot on the passive side and insert the passive side thumb into the slot using the convexity of the thumb (e.g., one or more of surfaces 308*a-d*, depending on which engage with the tray). In some embodiments, a 6 DOF controller is used to perform XYZ force control to ensure that the thumb is inserted and XYZ axis moment to ensure that the plane of the passive side panel is flush against the plane of the tray outer surface. In some embodiments, one or more sensors in side member 304 (or in the thumb of side member 304) are used to obtain information associated with a location of the tray, such as information indicating a position of the second side member relative to the first tray, information indicative of when the first tray is in a position at which the end effector is controlled to engage the passive-side structure with the hole (e.g., to detect when the tray is in proximity of the tray such as at an entry of the gripper such as for detection that end effector 300 is properly positioned to begin a process of engaging the tray with side member 304, etc.), the recess, or the handle comprised in the first structure, information indicative of when the first tray is in a position at which the passive-side structure is engaged with the hole, the recess, or the handle comprised in the first structure, and the like, or any combination thereof.

Using the flat extremities (e.g., 308*e*) of the thumbs to adjust for any orientation mismatch.

When all is good (e.g., in response to a determination that the side member 304 and/or active side member is positioned properly to grasp the tray, etc.), close the active side (e.g., 306) with force/moment control, to account for any residual orientation or positional uncertainty in the tray pose, and lift the tray up to make sanity checks for the quality of the grasp (e.g., weight as expected, forces and moments balanced and otherwise consistent with good grasp). In some embodiments, when the state of the gripper is deemed good, the active side is closed with force/moment control enabled in order to refine and correct for any residual orientation/position errors, which ensure gentle handling of the tray.

The robot safely aborts the pick if it detects any anomalies related to weight or quality of the trays in the stack or the quality of the stacking itself.

According to various embodiments, end effector 300 is controlled to actuate a second grasping mechanism between an active state (e.g., a deployed state) and an inactive state (e.g., a retracted state). As an example, when end effector 300 is controlled to operate in a first mode (e.g., to use a first grasping mechanism to grasp an item from a tray), the second grasping mechanism is actuated to be configured in an inactive state. During operation in the first mode, end effector 300 is transitioned to the inactive state in which one or more elements of the second grasping mechanism are moved to allow the first grasping mechanism to grasp the object (e.g., the item in a tray, etc.). As another example, when end effector 300 is controlled to operate in a second mode (e.g., to use a second grasping mechanism to grasp a tray), the second grasping mechanism is actuated to be configured in an active state. During operation in the second mode, end effector 300 is transitioned to the active state in which one or more elements of the second grasping mechanism are moved to allow the gripper arms to engage a tray or other object grasped by the second grasping mechanism.

Figure 3C:
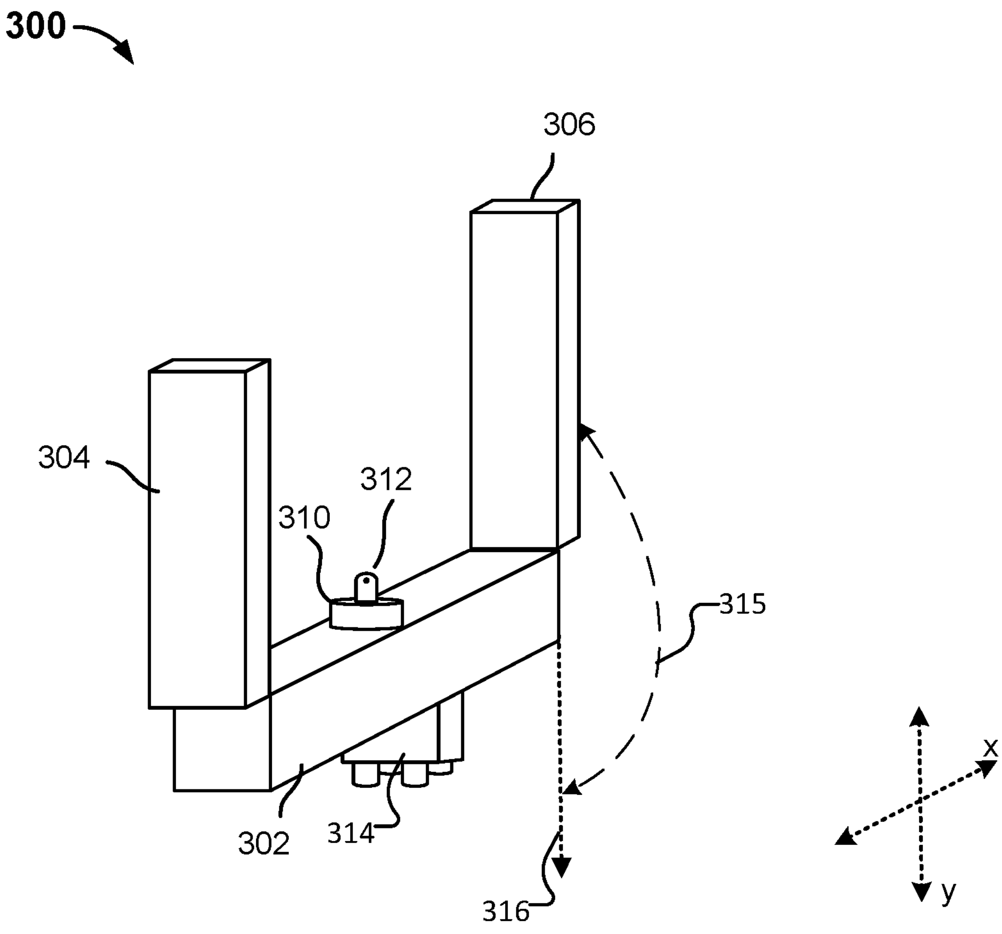
FIG. 3C is a block diagram illustrating a robotic end effector configured to perform kitting operations according to various embodiments.

FIG. 3C is a block diagram illustrating a robotic end effector configured to perform kitting operations according to various embodiments. End effector 300 comprises a second grasping mechanism that is controlled (e.g., during the second mode of operation of the multi-mode operation) to grasp items using gripper arms (e.g., side members 304, 306). In some embodiments, end effector 300 is controlled to move one or more of the gripper arms to open a grip to allow end effector 300 to move into position to grasp an object (e.g., a tray) and to move one or more of the gripper arms to close the grip on the object to be grasped.

In some embodiments, during operation of end effector 300 in the first mode, end effector transitioned to the inactive state in which elements (e.g., the gripper arms) are moved to a fully retracted state. As illustrated in FIG. 3C, side members 304, 306 are positioned in an active state in which side members 304, 306 are fully retracted and enable suction-based end effector 314 (e.g., the first grasping mechanism such as a suction-based end effector) to grasp an item.

Vector/direction 316 illustrates an example of a closed position (e.g., the closed position threshold) corresponding to end effector 300 being operated in the second mode (e.g., in which the gripper arms are positioned in the active state). In various embodiments, the closed position is a configuration according to which side member 306 forms a normal vector (or substantially a normal vector) relative to lateral member 302 and extends away from a part of lateral member 302 that is mounted to a robotic arm. For example, the closed position threshold is 90 degrees (or substantially 90 degrees) relative to a direction along which lateral member 302 extends. As illustrated in FIG. 3C, side members 304, 306 are moved to an open position (e.g., a retracted state). As side members 304, 306 are moved to the open position, an angle between side member 306 and vector/direction 316 is represented as angle 315. According to various embodiments, the open position threshold corresponds to a configuration at which angle 313 is between 145 degrees and 225 degrees. In some embodiments, open position threshold corresponds to a configuration at which angle 313 is between 180 degrees and 225 degrees.

Figure 4A:
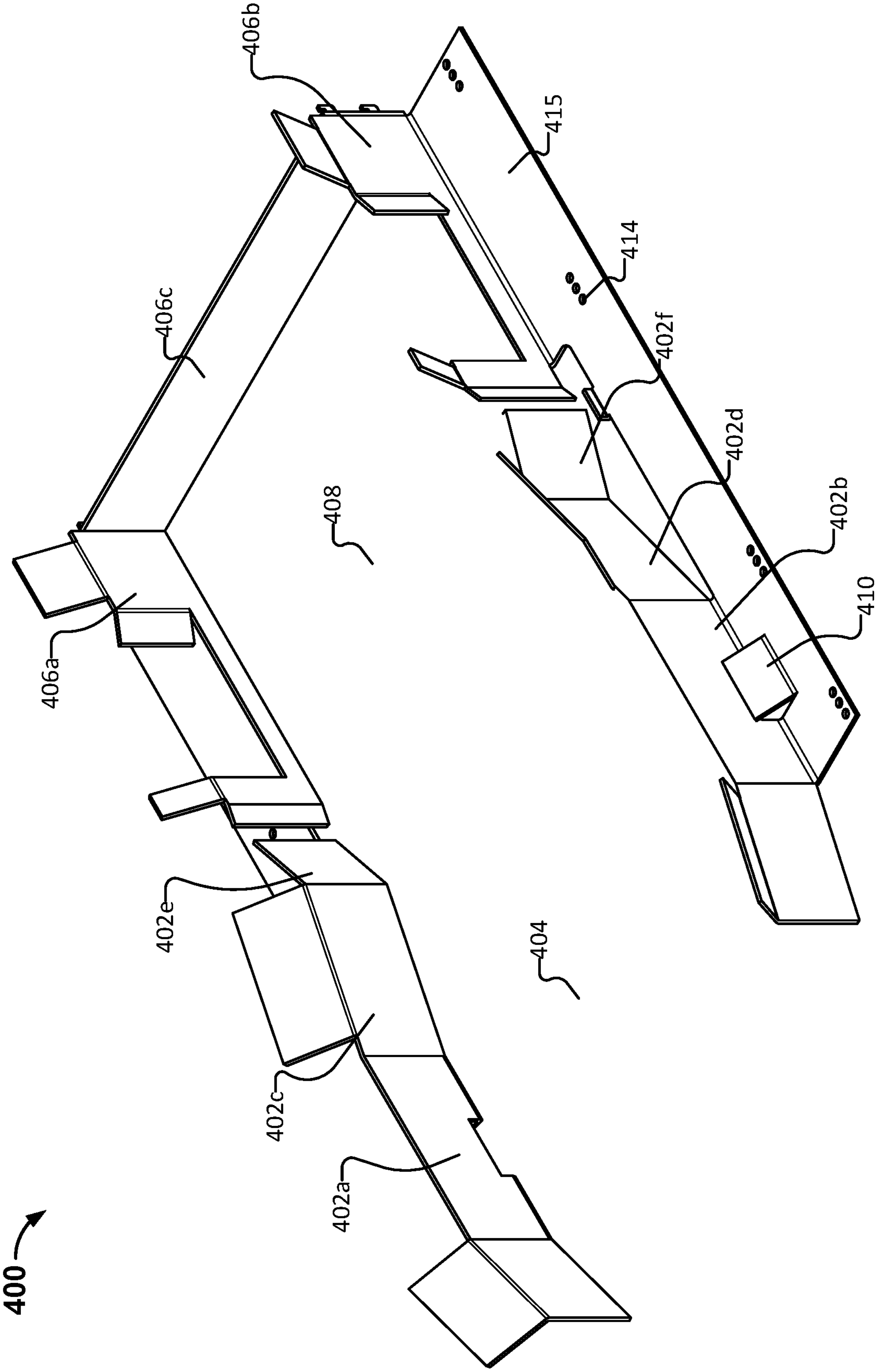
FIG. 4A is a diagram illustrating a stack containment structure according to various embodiments.

FIG. 4A is a diagram illustrating a stack containment structure according to various embodiments. Stack containment structure 400 may be implemented in connection with system 100 of FIGS. 1A and 1B, and/or system 200 of FIG. 2. In some embodiments, stack containment structure 400 is implemented to provide a predetermined location at which stacks/vehicles are inserted to a workspace and/or to provide support for the stacks/vehicles while a robot performs picking/placing operations with respect to the stacks/vehicles (e.g., to place items in trays, or to pick items from trays, etc.).

Deployment of stack containment structure 400 provides a predefined location at which stacks/vehicles are stored in workspace. For example, systems controlling robotic systems in the workspace, such as robot arms, can store and use predefined routines or plans for moving to a location in the workspace from which the pick/place operations can be performed with respect to the stacks/vehicles. As another example, systems controlling AGV or other robotic systems to insert stacks/vehicles to the workspace can use a predefined location for stack containment structure 400 (e.g., a predefined location within the workspace) in connection with controlling the AGV or other robotic system to accurately and efficiently move the stack/vehicle to/from the workspace and to insert or extract the stack/vehicle from the workspace.

In the example shown, stack containment structure 400 comprises a plurality of support structures that defined a plurality of areas. Stack containment structure 400 comprises insertion zone area 404 and kitting area 408. Insertion zone 404 and kitting area 408 may be connected to allow a stack/vehicle to be moved therebetween. For example, in response to a stack/vehicle being inserted to insertion zone 404, a robot arm may be controlled to push/pull the stack/vehicle to kitting area 408. Accordingly, stack containment structure 400 is disposed within proximity of the robot arm (e.g., such that the range of the robot arm is sufficient to allow the robot arm to engage the stack/vehicle and move the vehicle throughout stack containment structure 400).

As illustrated in FIG. 4*a*, stack containment structure 400 comprises an insertion zone structure (e.g., comprising insertion zone support structures 402*a*, 402*b*, and a kitting area structure (e.g., comprising kitting area support structures 406*a*, 406*b*. Stack containment structure 400 may further comprise one or more base plates, such as base plate 415 to which the insertion zone structure and the kitting area structure are mounted. In some embodiments, the insertion zone structure and/or the kitting area structure are integral with base plate 415. For example, the insertion zone structure, the kitting area structure, and base plate 415 are formed of a single material (e.g., that is cut and/or shaped to form stack containment structure 400. Base plate 415 provides support for the insertion zone structure and the kitting area structure. In addition, base plate 415 may comprise mounting mechanisms, such as through hole(s) 414, via which stack containment structure 400 may be fixedly mounted (e.g., bolted, or fastened using concrete anchors or other anchoring hardware for other types of floors or substrates) to a surface such as the ground/warehouse floor. In some implementations, base plate 415 may be sufficiently rigid and heavy to provide support to the insertion zone structure and the kitting area structure, and to prevent stack containment structure 400 from moving during operation of a robot arm to pick/place items from/to a stack inserted to stack containment structure.

According to various embodiments, insertion zone 404 corresponds to a location at which a stack/vehicle is introduced to, or removed from, stack containment structure 400. The insertion zone structure may be configured to comprise an opening via which the stack/vehicle is introduced to, or removed from, stack containment structure 400. In some embodiments, the insertion zone structure is further configured to define an opening via which a stack/vehicle may be moved between insertion zone 404 and kitting area 408. A stack/vehicle may be inserted to stack containment structure 400 via insertion zone 404 manually or by the system controlling a robot to do so. To facilitate insertion of the stack/vehicle to insertion zone 404, the insertion zone structure may comprise a plurality of insertion zone support structures (e.g., insertion zone support structures 402*a*, 402*b*) that define an opening to insertion zone 404. The plurality of insertion zone support structures may be deformable/deflectable. For example, the plurality of insertion zone support structures may be deformable/deflectable based on material selection and/or the shaping of the insertion zone structures. The insertion zone support structures promote ease of stack/vehicle insertion/removal by defining an opening to insertion zone 404 that is sufficiently large to provide tolerance with respect to a size/dimension of the stack/vehicle, and by deforming/deflecting as the stack/vehicle engages the size of insertion zone 404 (e.g., the particular insertion zone support structure 402*a*, 402*b*). The tolerance for insertion/removal of the stack/vehicle based on the spacing and deformability of the insertion zone support structures allows for quick and easy insertion/removal to stack containment structure 400 even if the model of the workspace that is generated by the vision system in the workspace is not a perfect depiction of the workspace (e.g., the tolerances account for deviations in sensor or camera performance).

As illustrated in FIG. 4*a*, insertion zone support structures 402*a*, 402*b* (e.g., deflecting arms) are curved or angular, or otherwise shaped to guide a stack/vehicle towards a first position (e.g., insertion zone 404) during insertion, or towards the external environment from insertion zone 404 during removal from stack containment structure 400. The deflecting arms are shaped to hold stack/vehicle in insertion zone 404 (e.g., up to a particular force threshold) during normal operation of the system in which stack containment structure 400 is deployed. Further, the deflecting arms deflect to allow the stack/vehicle to be moved to a second position (e.g., kitting area 408) when sufficient force is applied to the stack/vehicle (which in turn applies force to applicable deflecting arm(s)). For example, insertion zone support structures 402*a*, 402*b* deflect as a robot arm is controlled to push/pull the stack towards the kitting area (e.g., to be further in range of the robot arm during picking/placing operations). In some embodiments, to promote the holding of the stack/vehicle in insertion zone 404, one or more of insertion zone support structures 402*a*, 402*b* are angled or curved to at least partially wrap around/envelope a stack/vehicle (e.g., to wrap around corners of the stack). In some embodiments, to promote the movement of the stack/vehicle from insertion zone 404 to kitting area 408, at least part of insertion zone support structures 402*a* and/or 402*b* may be configured (e.g., shaped or include a panel) to be angled in the direction towards kitting area 408 (e.g., angled/directed towards the interior/center of kitting area 408). For example, the insertion zone support structures comprise stack pull funnels 402*c*, 402*d* that funnel the stack/vehicle towards kitting area 408. In some embodiments, to promote the movement of the stack/vehicle from kitting area 408 to insertion zone 404, at least part of insertion zone support structures 402*a*, 402*b* are configured (e.g., shaped or include a panel) to be angled in the direction of insertion zone 402. For example, a part of the insertion zone support structures closest to (e.g., adjacent to) kitting area (e.g., the proximal end of the insertion zone support structures) are angled towards the interior of insertion zone 404. As another example, a distal end of the insertion zone support structures is angled towards the center of insertion zone 404 (e.g., to assist with holding the stack/vehicle. For example, insertion zone support structures 402*a*, 402*b* comprises stack push funnels 402*e*, 402*f* that are configured to funnel a stack from kitting area 408 to insertion zone 404.

In some embodiments, a distance between a distal end of insertion zone support structure 402*a* and insertion zone support structure 404*b* is greater than a width of a stack/vehicle to be inserted to stack containment structure 400. For example, the distance between the respective distal ends of the insertion zone support structure may be at least 5% greater than the width of the stack/vehicle. As another example, the distance between the respective distal ends of the insertion zone support structures may be at least 10% greater than the width of the stack/vehicle. As another example, the distance between the respective distal ends of the insertion zone support structure may be at least 20% greater than the width of the stack/vehicle.

According to various embodiments, stack placement funnels (e.g., parts of the insertion zone support structure that funnel the stack/vehicle towards the insertion zone 404) or the distance between respective distal ends of the insertion zone support structure allow AGVs to drop off stacks (e.g., insert stacks) within a ±2-inch range.

In some embodiments, stack containment structure 400 comprises one or more bump stop structures that restricts an amount of deflection of at least one insertion zone support structure. In the example shown, stack containment structure 400 comprises bump stop 410 that is connected (or integral with) insertion zone support structure 402*b*. Bump stop 410 may further be connected to (or integral with) base plate 415. As a stack/vehicle is introduced to stack containment structure 400 by inserting the stack at the opening of insertion zone 404, the stack may engage an insertion zone support structure, thereby causing the insertion zone support structure to be deflected. Bump stop 410 limits an extent to which the insertion zone support structure during insertion/removal of stacks from stack containment structure 400.

According to various embodiments, kitting area 408 corresponds to a location at which a stack/vehicle is positioned for a robot arm to perform pick/place operations with respect to the stack/vehicle. The robot arm introduces forces to the system (e.g., stack containment structure 400) during the pick/place operations. As a result, various embodiments use a kitting area support structure defining the kitting area to provide support for the stack/vehicle. The kitting area structure comprises a plurality of kitting area support structures (e.g., kitting area support structures 406*a*, 406*b*) that are configured to hold the vehicle or stack (e.g., a vehicle or stack of a predefined size/dimensions). In some embodiments, the plurality of kitting area support structures is sufficiently rigid to provide support to the vehicle or stack while a robotic is performing the kitting operations.

In some embodiments, one or more of the kitting support structures are configured to allow a robot arm to grasp a tray on the stack (or object in the tray) from the side. For example, the kitting support structure(s) are shaped to allow a robot arm using an end effector comprising gripper arms to grasp the tray(s) from the tray stack from the sides (e.g., from opposing sides of the tray). As illustrated in FIG. 4*a*, each of kitting area support structures 406*a*, 406*b* is shaped to have openings (or otherwise provide clearance or expose part of the stack/vehicle) at the sides of kitting area support structures 406*a*, 406*b*. In some embodiments, a distance between opposing insertion zone support structures (e.g., insertion zone support structures 402*a*, 402*b*) is greater than a distance between opposing kitting area support structures (e.g., kitting area support structures 406*a*, 406*b*). For example, a distance between opposing kitting area support structures (e.g., kitting area support structures 406*a*, 406*b*) has a tighter tolerance with respect to a width of the stack/vehicle to be inserted to stack containment structure than the opposing insertion zone support structures.

In the example shown in FIG. 4*a*, a proximal end of the kitting area structure includes end stop 406*c*. In some embodiments, the stack containment structure is configured with the end stop to restrict the stack/vehicle from exiting kitting area at the proximal end and to provide support for the stack/vehicle as a robot arm is performing picking/placing items or trays to/from the stack/vehicle. The end stop may define an extent to which the stack/vehicle is inserted to kitting area 408. For example, the robot arm may pull the stack/vehicle to an extent that stack/vehicle engages end stop 406*c*.

In some embodiments, insertion zone support structures 402*a*, 402*b* and/or kitting area support structures 406*a*, 406*b* comprise a sheet metal gusset.

In some embodiments, the insertion zone support structures and/or kitting area support structures have a height that is sufficient to hold the stack within the stack containment area. For example, the height of the kitting area support structures may be sufficiently high to prevent a stack from tipping during operation of the robot arm to pick/place items or trays from/to the stack.

In some embodiments, one or more parts of stack containment structure 400 are made of sheet metal. For example, in some implementation, all parts of stack containment structure 400 (or at least all support structures thereof) are made of sheet metal.

Figure 4B:
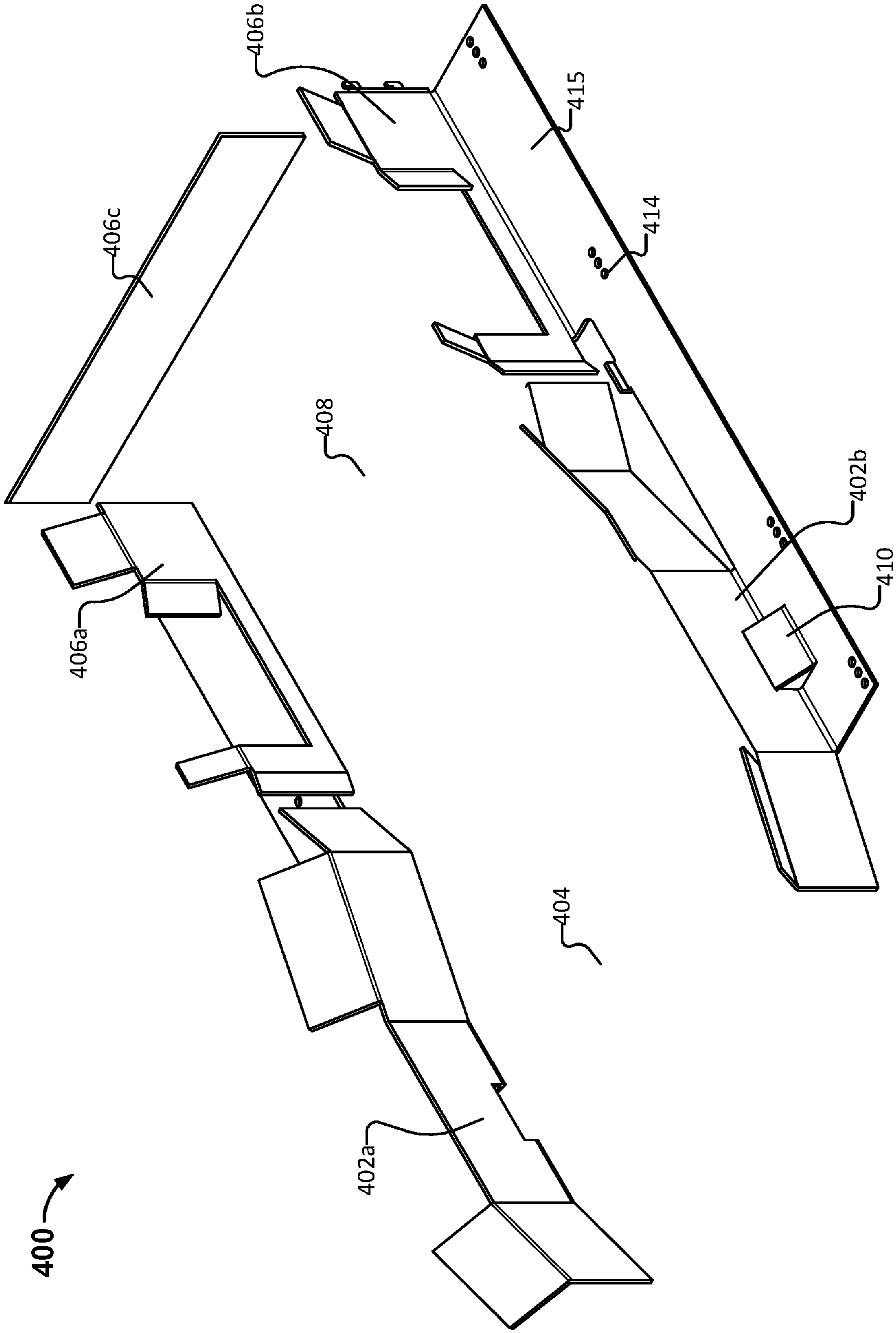
FIG. 4B is a diagram illustrating a stack containment structure according to various embodiments.

FIG. 4B is a diagram illustrating a stack containment structure according to various embodiments. In the example shown, stack containment structure comprises a removable end stop 406*c*. End stop 406*c* may be removed, such as in the case that a length of the stack/vehicle to be inserted is greater than the dimension of kitting area 408.

As illustrated in FIG. 4*b*, stack containment structure 400 comprises two sides that are connected via end stop 406*c*. For example, a first side comprises insertion zone support structure 402*a* and kitting area support structure 406*a*, and a second side comprises insertion zone support structure 402*b* and kitting area support structure 406*b*.

According to various embodiments, vehicles/stacks may be inserted vertically by lowering/placing the vehicle/stack into the insertion zone, or by pushing/pulling the vehicle/stack through an opening in the stack containment structure, such as an opening defined by insertion zone structure (e.g., via the spacing between a first insertion zone support structure and a second insertion zone support structure). The stack containment structure may be configured to facilitate insertion via either of the aforementioned mechanisms, such as by comprising (i) guides or funnels that promote insertion to a predefined area (e.g., the insertion zone) at least by guiding or directing the vehicle being inserted towards the predefined area, and/or (ii) deflectable/deformable members/structures that deflect to ensure that the vehicle/stack is successfully inserted even if the precision with which the vehicle is being inserted is within a predefined tolerance (e.g., ±2 inches, ±5 inches, etc.).

Figure 4C:
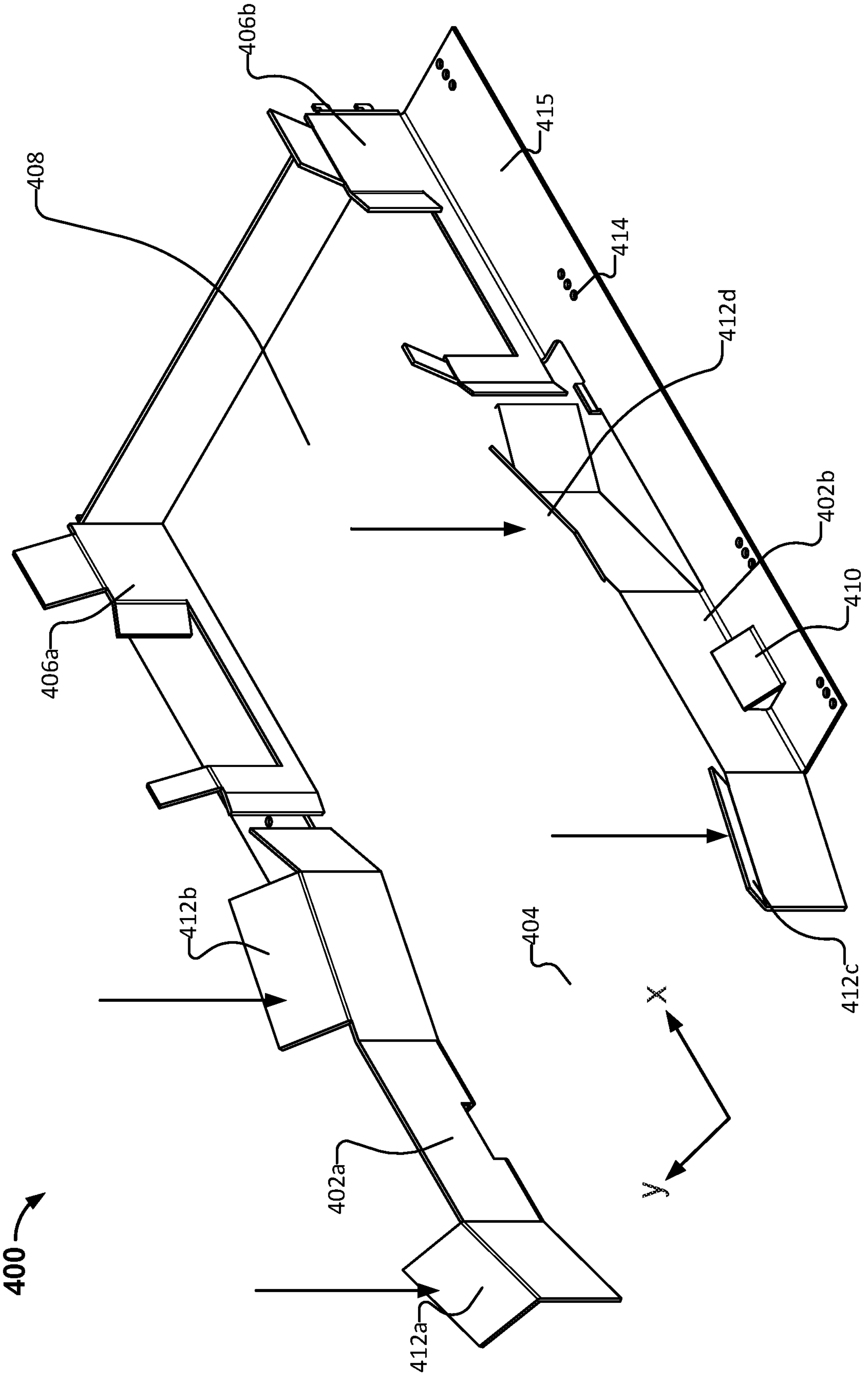
FIG. 4C is a diagram illustrating a stack containment structure according to various embodiments.

FIG. 4C is a diagram illustrating a stack containment structure according to various embodiments. In the example shown, stack containment structure 400 comprises stack placement funnels 412*a*, 412*b*, 412*c*, and 412*d*. For example, stack placement funnels 412*a* and 412*b* are comprised in insertion zone support structure 402*a*, and stack placement funnels 412*c* and 412*d* are comprised in insertion zone support structure 402*b*. Stack placement funnels 412*a*, 412*b*, 412*c*, and 412*d* may guide stacks during placement in insertion zone 404 or movement (e.g., pull) to kitting area 408. For example, stack placement funnels 412*a*, 412*b*, 412*c*, and 412*d* may assist with the avoidance of snags (e.g., a stack snagging on the frame/structure of stack containment structure 400) during the pulling of the vehicle to kitting area 408. As illustrated, stack placement funnels 412*a*, 412*b*, 412*c*, and 412*d* are angled downwards and towards the interior of insertion zone 404.

Figure 4D:
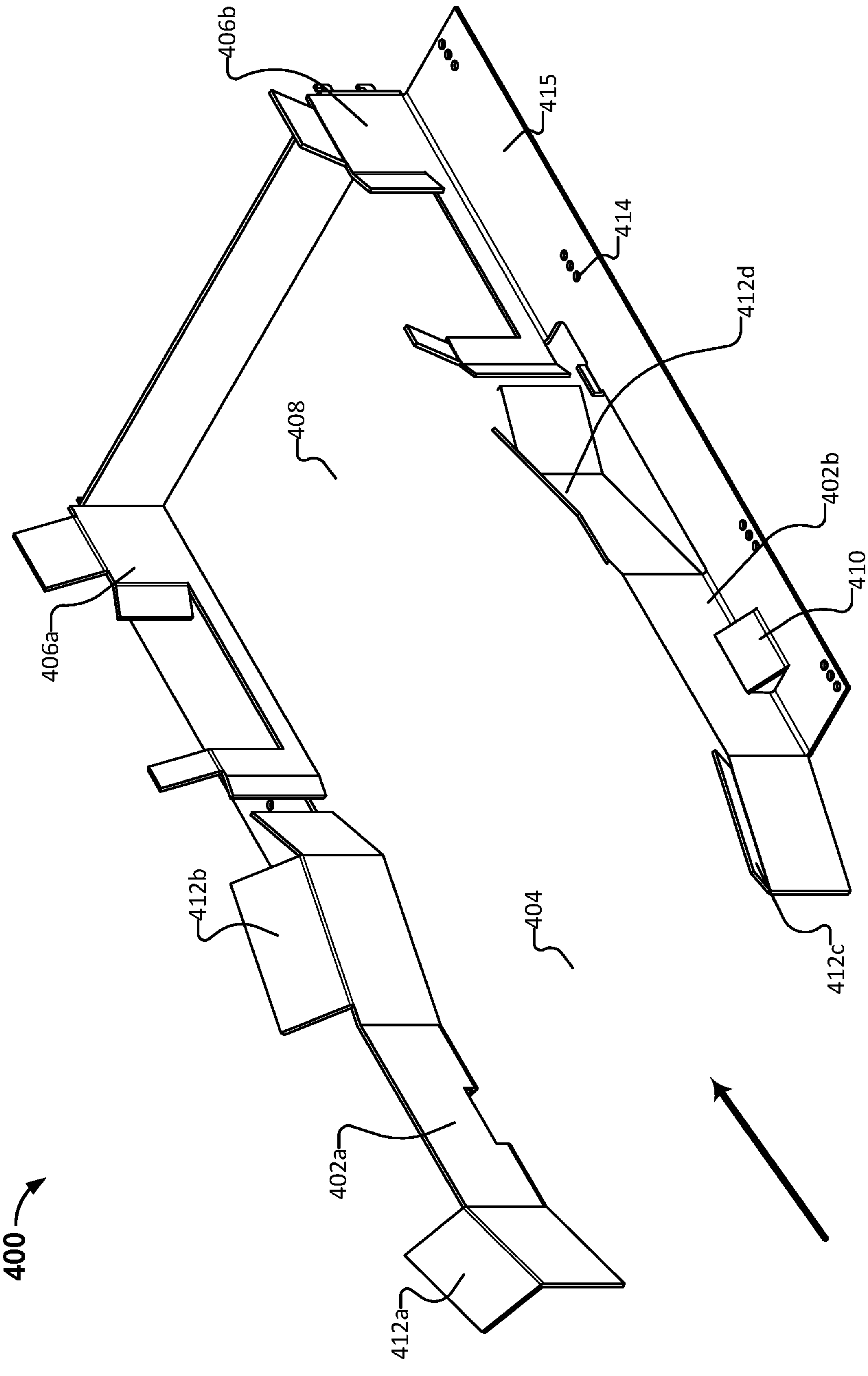
FIG. 4D is a diagram illustrating a stack containment structure according to various embodiments.

FIG. 4D is a diagram illustrating a stack containment structure according to various embodiments. In the example shown, tray stack 425 is inserted into stack containment structure 400 via the opening to insertion zone 404 (e.g., an opening formed by the spacing between insertion zone support structures 402*a*, 402*b* at a distal end of stack containment structure 400).

Figure 4E:
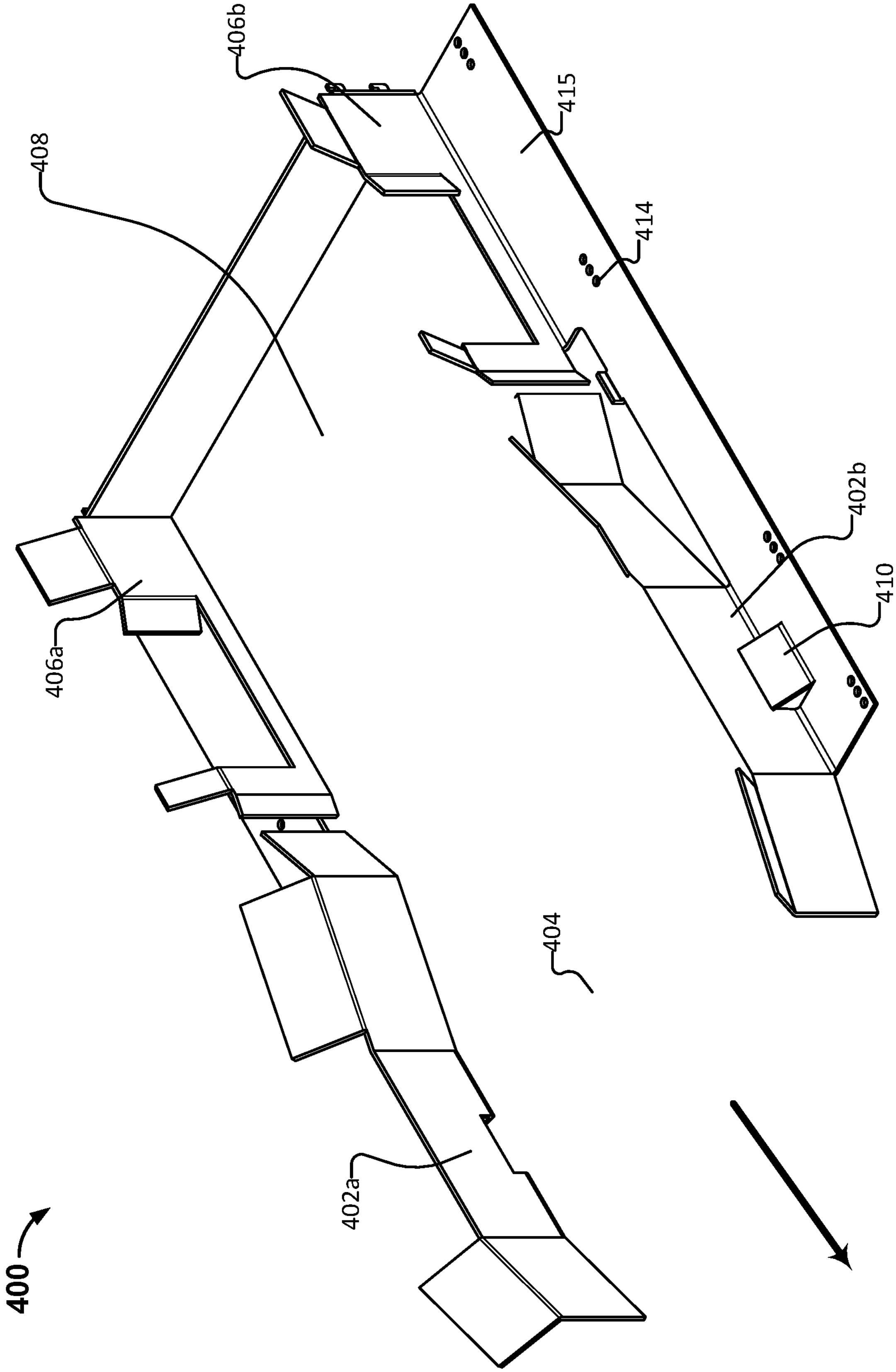
FIG. 4E is a diagram illustrating a stack containment structure according to various embodiments.

FIG. 4E is a diagram illustrating a stack containment structure according to various embodiments. In the example shown, tray stack 425 is removed from stack containment structure 400 via the opening to insertion zone 404.

Figure 4F:
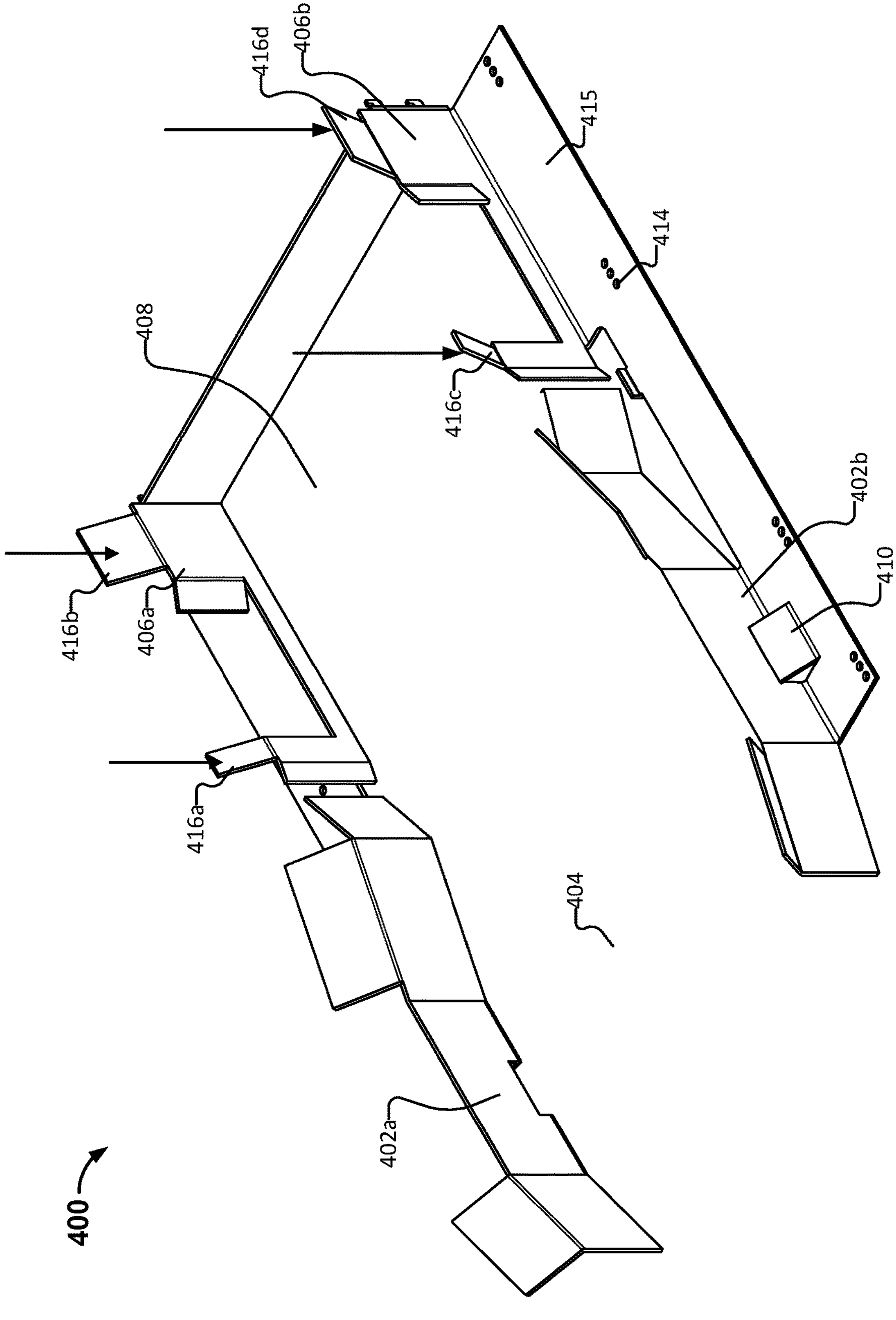
FIG. 4F is a diagram illustrating a stack containment structure according to various embodiments.

FIG. 4F is a diagram illustrating a stack containment structure according to various embodiments. In the example shown, stack containment structure comprises one or more tray placement funnels. The tray placement funnel(s) may be configured to guide a tray towards a stack/vehicle in the kitting area such as during placement of the tray by robotic arm. Tray placement funnels 416*a*, 416*b*, 416*c*, and 416*d* may be configured to be angled inwards to kitting area 408. As such, tray placement funnels 416*a*, 416*b*, 416*c*, and 416*d* allow for a greater tolerance in placement locations for placing trays on a stack in kitting area 408. Accordingly, a certain imprecision in the placement location by robot arm is accommodated by the use of tray placement funnels to guide the placement to the correct/intended placement location.

Figure 4G:
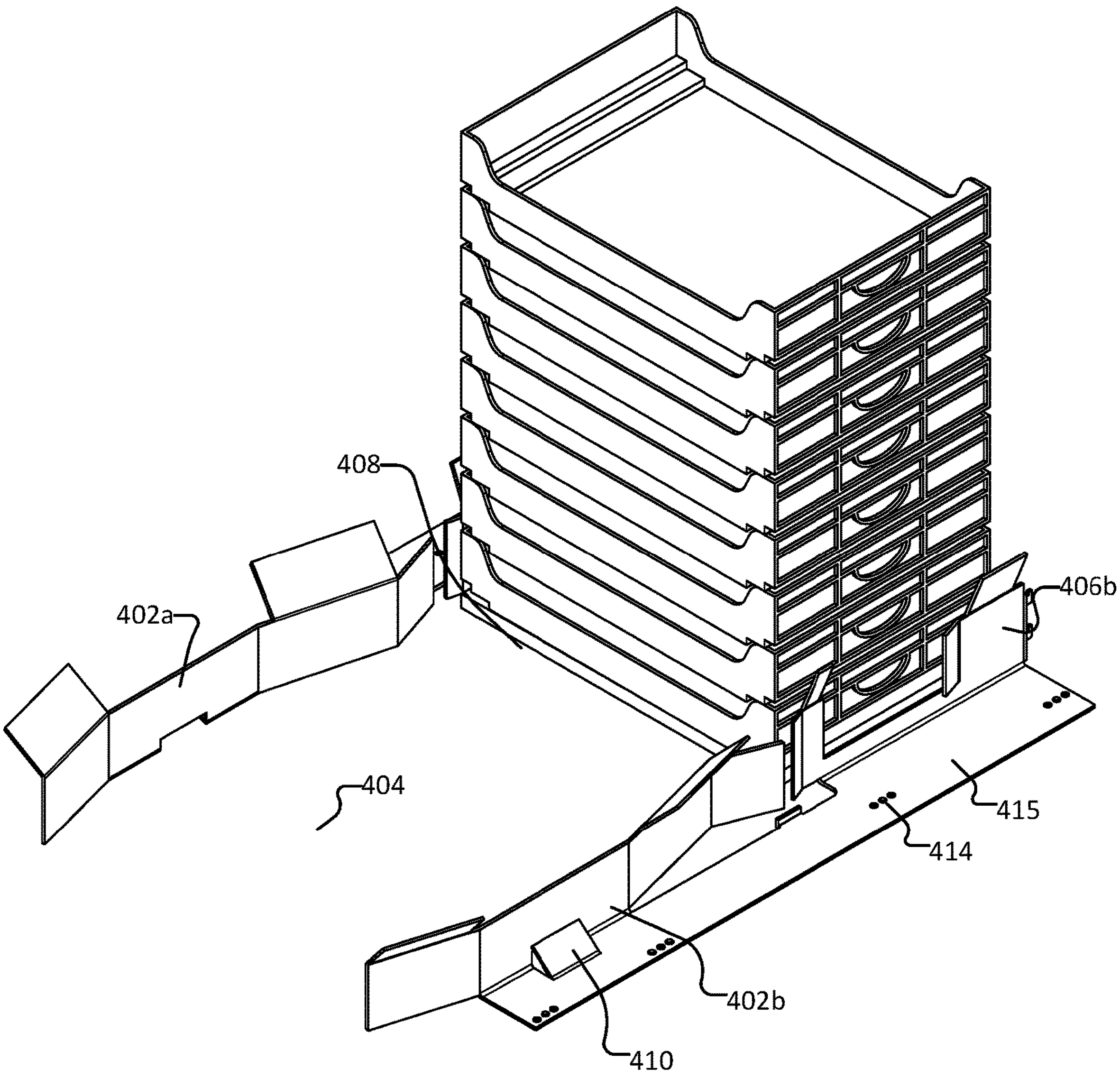
FIG. 4G is a diagram illustrating a stack containment structure according to various embodiments.

FIG. 4G is a diagram illustrating a stack containment structure according to various embodiments. In the example shown, tray stack 425 is positioned in kitting area 408. As illustrated in FIG. 4G, tray stack 425 fits snugly in kitting area 408. The kitting area support structures provide support to the stack during the placement/removal of items or trays from tray stack 424. Further, as a robot arm attempts to grasp a bottom tray or other tray having a handle or gripping structure that is lower than the height of the kitting area support structures, the cutouts/cutaways in the sides of the kitting area support structures allow the robot arm to use gripper arms or otherwise engage the trays from the sides.

Figure 4H:
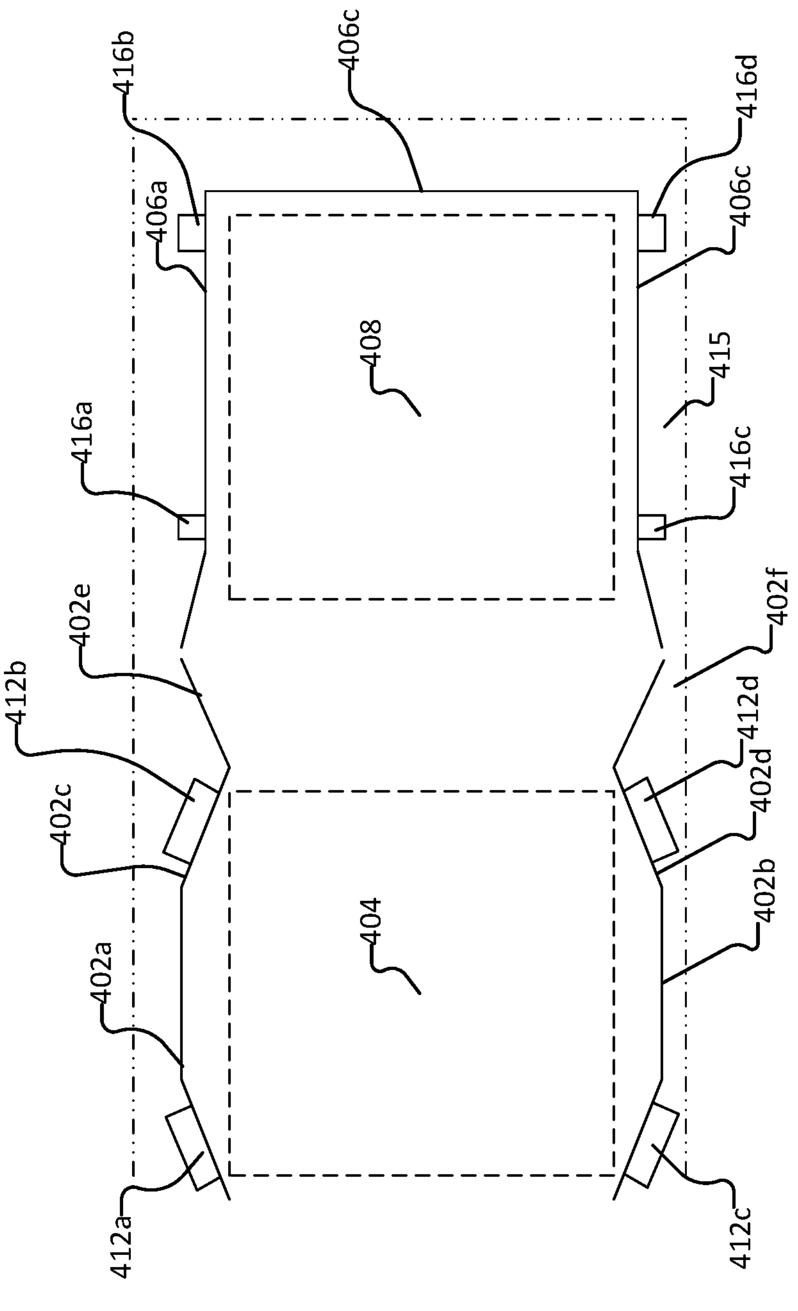
FIG. 4H is a diagram illustrating a top view of a stack containment structure according to various embodiments.

FIG. 4H is a diagram illustrating a top view of a stack containment structure according to various embodiments. The top view of stack containment structure 400 provided in FIG. 4H illustrates a relative sizing/shapes of insertion zone 404 and kitting area 408. In some embodiments, insertion zone 404 and kitting area 408 are sized to ensure that a stack/vehicle fits within each zone. The insertion zone structure provides looser tolerances than the tighter tolerances of kitting area 408. The tighter tolerances of kitting area 408 ensure that the stack/vehicle is more snugly contained within the kitting area structure, which thereby ensures that the kitting area structure provides greater/better support than the insertion zone structure. The looser tolerances of the insertion zone structure ensure that the stack/vehicle is more easily/efficiently inserted/removed to/from insertion zone 404. For example, the looser tolerances of the insertion zone structure ensure that a robot or human that is loading the stack/vehicle to insertion zone 404 is not required to move and place the stack/vehicle in very precise locations.

As illustrated, the insertion zone support structures comprise stack pull funnels 402*c*, 402*d* that funnel the stack/vehicle towards kitting area 408. Stack pull funnels 402*c*, 402*d* are deformable/deflectable and are oriented to guide the stack/vehicle towards kitting area 408 in response to the stack/vehicle being pushed/pulled towards kitting area 408, such as by a robot arm. In some embodiments, stack pull funnels 402*c*, 402*d* deform/deflect (e.g., sufficiently deform/deflect to permit passage of stack/vehicle to kitting area 408) if the force on the stack/vehicle exceeds a threshold force. Otherwise, stack pull funnels 402*c*, 402*d* assist with holding stack/vehicle within insertion zone 404.

Similarly, stack containment structure 400 (e.g., the kitting area support structures) comprises stack push funnels 402*e*, 402*f* that funnel the stack/vehicle towards insertion zone 404. Stack push funnels 402*e*, 402*f* are deformable/deflectable and are oriented to guide the stack/vehicle towards insertion zone 404 in response to the stack/vehicle being pushed/pulled towards insertion zone 404, such as by a robot arm. In some embodiments, stack push funnels 402*e*, 402*f* deform/deflect (e.g., sufficiently deform/deflect to permit passage of stack/vehicle to insertion zone 404) if the force on the stack/vehicle exceeds a threshold force. Otherwise, stack push funnels 402*e*, 402*f* assist with holding stack/vehicle within kitting area 408.

Figure 4I:
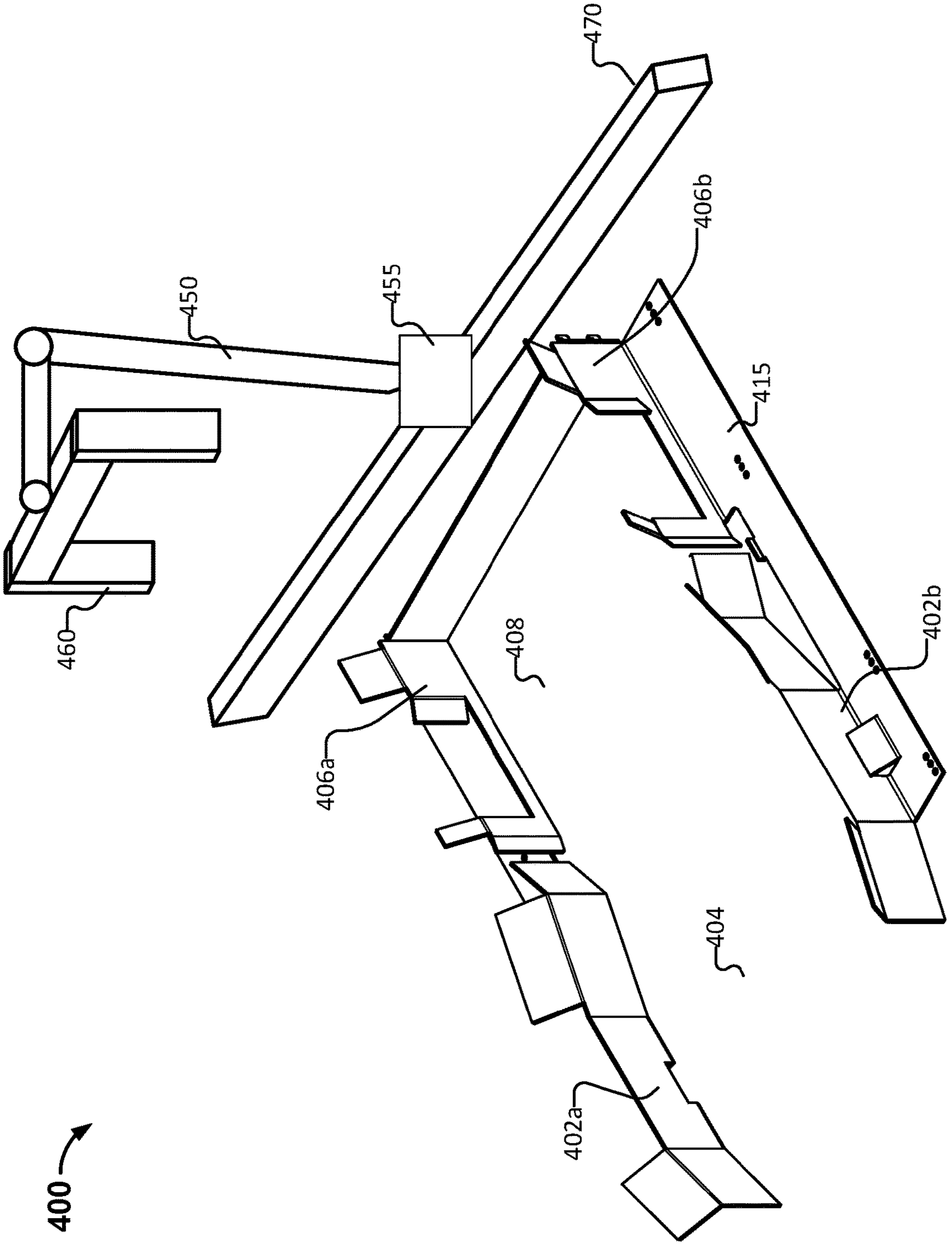
FIG. 4I is a diagram illustrating a stack containment structure according to various embodiments.

FIG. 4I is a diagram illustrating a stack containment structure according to various embodiments. In the example shown, stack containment structure 400 is deployed in connection with a robotic system. Stack containment structure 400 is positioned in proximity to robotic arm 450 (or in proximity to a location of rail 470 along which robot arm 450 can traverse via carriage 455). The robotic system (e.g., a kitting system) may control robot arm 450 to move to a location along rail 470 according to which stack containment structure, or at least a stack comprised in kitting area 408) is within range of robot arm 450. In response to determining that robot arm 450 has moved to within range of the stack, the robotic system controls robot arm 450 to pick/place items or trays from/to the stack using end effector 460. The robotic system may generate a plan to perform the pick/place operations. For example, the robotic system determines a plan for moving robot arm 450 to within range of the stack and a plan for then configuring robot arm 450 to grasp an item or tray from the stack (or to place an item or tray to the stack).

Figure 5:
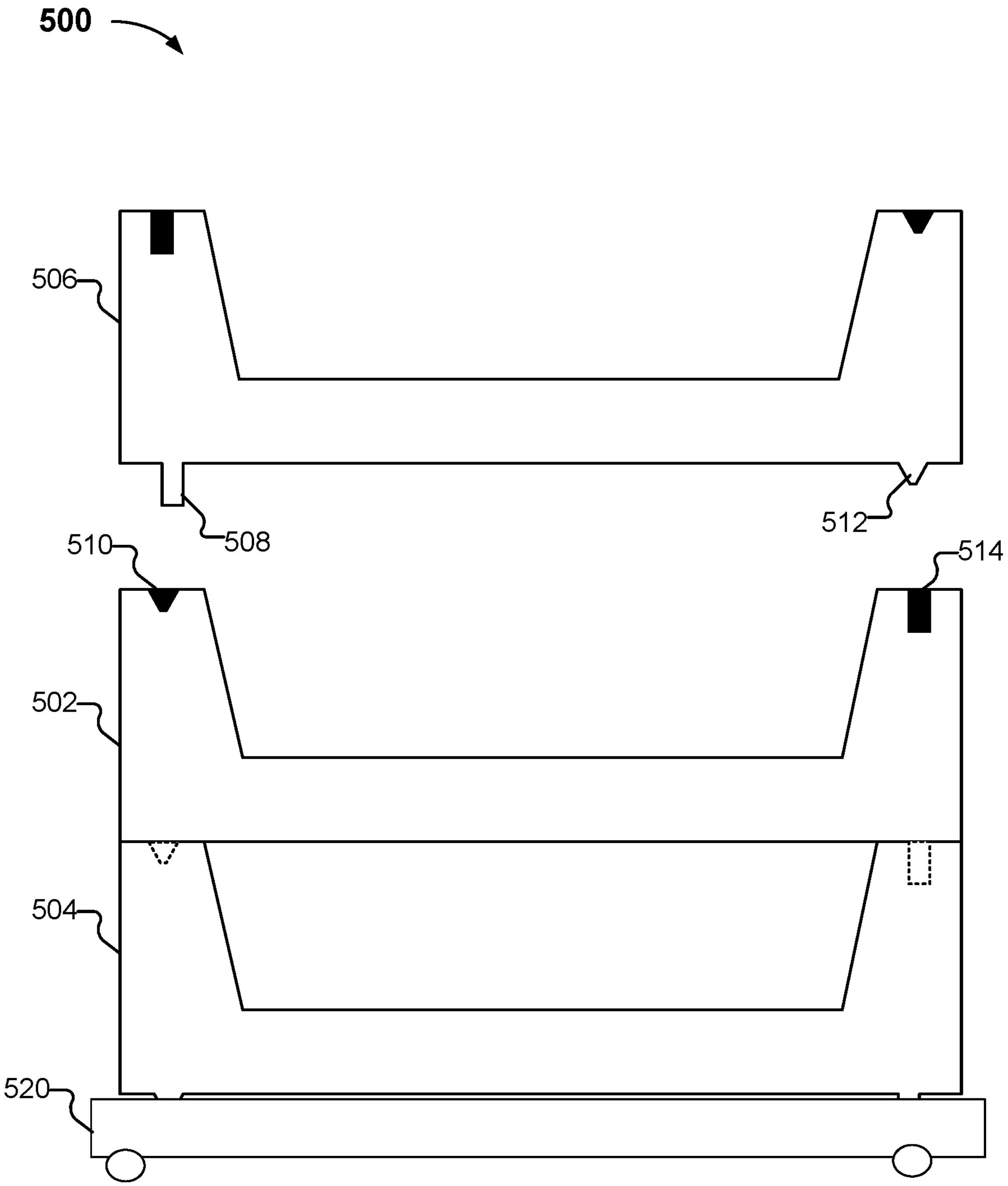
FIG. 5 is a diagram illustrating an example of a stack of trays configured to be stacked in a specific tray orientation.

FIG. 5 is a diagram illustrating an example of a stack of trays configured to be stacked in a specific tray orientation. In the example shown, destination stack 500 includes a tray 502 stacked on top of a tray 1204. A tray 506 is to be added to the top of the stack 500. The trays 502, 504, 506 each include a pair of dissimilarly shaped recesses at the top of the tray, e.g., recesses 510 and 514 on the top of tray 502, one a on first side and the other on the opposite side, and corresponding protrusions at the bottom of the tray, e.g., protrusions 508 and 1212 at the bottom of tray 506. As shown in FIG. 5, the protrusion 508 is of a size and shape to fit into recess 514, while protrusion 512 is of a size and shape to fit into recess 510. However, as shown tray 506 is flipped around such that the protrusion 508 is over recess 510, which it does not match, while protrusion 512 is positioned over recess 514, which it also does not match.

In various embodiments, a tray handling robot system as disclosed herein learns and/or is trained to recognize a force sensor reading and/or profile associated with a misalignment as shown in FIG. 5. The system may detect, e.g., upon attempting to place the tray 506 onto tray 502, that the tray 506 is not slotted securely onto tray 502 in a way associated with the tray 506 being flipped around into a reverse position, as shown in FIG. 5. In various embodiments, in response to detecting an incorrect orientation as shown in FIG. 5, the system lifts the tray (e.g., 506) up, rotates the tray 180 degrees around the z (up/down) axis, and renews its attempt to place the tray on top of the destination stack.

Figure 6:
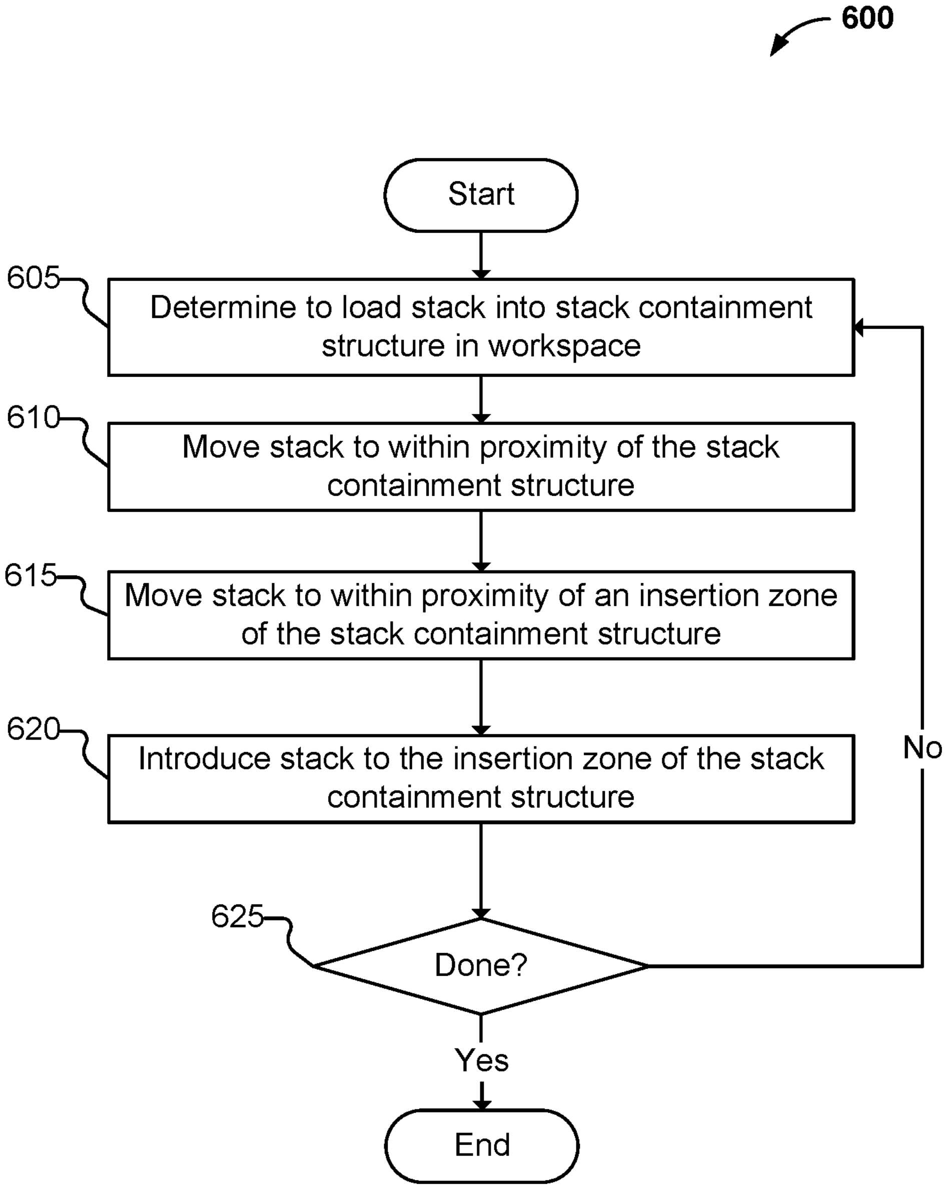
FIG. 6 is a flow diagram of a process for inserting a vehicle or stack to a stack containment structure according to various embodiments.

FIG. 6 is a flow diagram of a process for inserting a vehicle or stack to a stack containment structure according to various embodiments. According to various embodiments, process 600 is implemented in connection with system 100 of FIG. 1A and/or system 200 of FIG. 2. Process 600 may be implemented in connection with a system comprising stack containment structure such as stack containment structure 400 of FIG. 4.

At 605, the system determines to load a stack into a stack (or a vehicle, such as a dolly comprising a stack of trays) containment structure in a workspace. In some embodiments, the system determines to load a stack into a stack containment structure in response to determining that a stack is to be unloaded or loaded (e.g., in response to determining that pick/place operations are to be performed with respect to the stack).

The system may determine to load the stack into the stack containment structure based on a high-level plan to completing picking/placing operations for a particular order, manifest, packing slip, etc. For example, if the system stores an order according to which a plurality of trays is to be loaded and delivered, the system may determine a high-level plan for stacking the trays on one or more vehicles/stacks. The system may determine to load the stack into the stack containment structure in connection with the high-level plan for stacking the trays on one or more vehicles/stacks, such as in response to determining that a first tray stack on a first vehicle/stack of the one or more vehicles/stacks is complete and that additional trays remain to be loaded. As another example, if the system stores an order according to which a plurality of trays, or items within the trays, are to be unloaded and carried elsewhere in the warehouse, etc., the system may determine a high-level plan for processing the trays to remove the items/trays from tray stacks.

At 610, the stack is moved to within proximity of the stack containment structure. In response to determining that the stack is to be loaded to the stack containment structure, the stack is moved to within proximity of the stack containment structure. For example, the stack is moved to within a predefined range/distance of the stack containment structure.

The stack may be moved to the stack containment structure by a robot controlled by, or having a control system in communication with, the system (e.g., the kitting system that controls a robot arm to pick/place trays or items with respect to stacks in the stack containment structure).

The stack may alternatively be moved to the stack containment structure manually by a user. For example, the system may communicate with the user (e.g., via a user interface or other communication mechanism) to indicate that the stack is to be loaded into the stack containment structure.

At 615, the stack is moved to within proximity of the insertion zone of the stack containment structure. In some embodiments, in response to determining that the stack is within proximity of the stack containment structure, the system determines a plan for moving the stack to within proximity of the insertion zone. The system may provide an instruction to a robot (e.g., an AGV), or system controlling the robot, to move the stack to a particular destination location.

In some embodiments, 610 and 615 are combined into a single step in which the delivery/movement of the stack to the stack containment structure comprises moving the stack to within proximity to (e.g., a predefined distance of) the insertion zone of the stack containment structure.

At 620, the stack is introduced to the insertion zone of the stack containment structure. In some embodiments, the system controls a robot such as an AGV (or provides instructions to another system controlling the robot) to introduce the stack to the insertion zone.

In some embodiments, the system controls the robot to place the stack vertically down to the insertion zone of the stack containment structure. The stack placement funnels may assist with guiding the stack to within the insertion zone, thus providing sufficient tolerance for the robot to accurately and efficiently place the stack within the stack containment structure.

In some embodiments, the system controls the robot to push or pull the stack through an opening defined by the insertion zone structure. For example, the system controls the robot to push the stack through the space between a first insertion zone support structure and a second insertion zone support structure.

At 625, a determination is made as to whether process 600 is complete. In some embodiments, process 600 is determined to be complete in response to a determination that insertion of the vehicle or stack is successfully introduced to the insertion zone of the stack containment structure, no further vehicles or stacks are to be inserted to the stack containment structure, no further vehicles or stacks are to be inserted to other stack containment structures within the workspace, a user has exited the system, an administrator indicates that process 600 is to be paused or stopped, etc. In response to a determination that process 600 is complete, process 600 ends. In response to a determination that process 600 is not complete, process 600 returns to 605.

Figure 7:
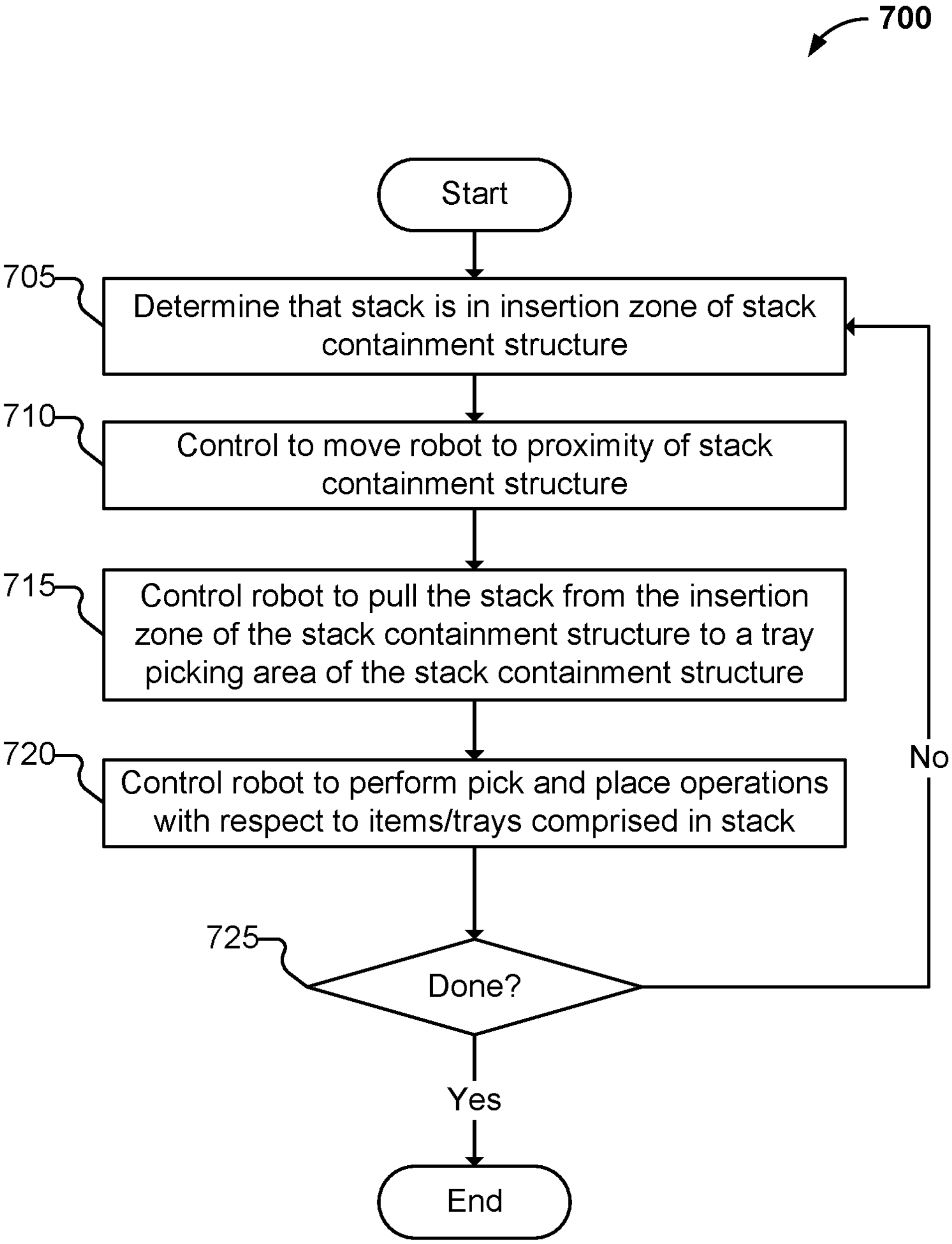
FIG. 7 is a flow diagram of a process for moving a vehicle or stack within a stack containment structure in connection with performing pick or place operations according to various embodiments.

FIG. 7 is a flow diagram of a process for moving a vehicle or stack within a stack containment structure in connection with performing pick or place operations according to various embodiments. According to various embodiments, process 700 is implemented in connection with system 100 of FIG. 1A and/or system 200 of FIG. 2. Process 700 may be implemented in connection with a system comprising stack containment structure such as stack containment structure 400 of FIG. 4.

In some embodiments, system 700 is invoked in response to determining that process 600 of FIG. 6 has completed, or otherwise in response to determining that the stack is within the stack containment structure.

At 705, the system determines that a stack is in the insertion zone of the stack containment structure. In some embodiments, the system uses information obtained by a vision system within the workspace to determine that the stack is within the insertion zone. For example, the system may use the information obtained by the vision system to generate a model of the workspace, including the range of a robot arm and the stack containment structure placed within the workspace.

In some embodiments, the system determines that the stack is in the insertion zone based on a communication with the robot that inserted the stack to the stack containment structure or based on a user input to a user interface (e.g., after the stack is manually inserted). For example, the AGV may provide an indication to the control computer of the system that the stack was successfully introduced to the stack containment structure.

At 710, a robot is controlled to move within proximity of the stack containment structure. In response to determining that the stack is within the stack containment structure (e.g., in the insertion zone), the system may determine to begin performing pick/place operations with respect to the stack. The system may determine a plan for moving a robot to within proximity of the stack containment structure (e.g., to within range of the stack) and for performing the pick/place operations. For example, the plan generated by the system to perform the pick/place operations includes a plan (e.g., a lower-level plan) to move the stack from the insertion zone to the tray picking area (e.g., the kitting area) of the stack containment structure. The plan for moving the stack from the insertion zone to the tray picking area may include a strategy for moving a robot to within range of the stack and controlling the robot to push/pull the stack from the insertion zone to the tray picking area.

At 715, the robot is controlled to pull the stack from the insertion zone of the stack containment structure to a tray picking area of the stack containment structure. In other embodiments, the robot (or another robotic system such as a stack pusher system) may be controlled to move (e.g., push) the stack from the insertion zone to the tray picking area (e.g., the kitting area of the stack containment structure).

At 720, the robot is controlled to perform pick and place operations with respect to items or trays comprised in the stack. The system may determine a high-level plan for loading/unloading the stack, including lower level plans for one or more of: (a) introducing the stack to the stack containment structure (e.g., to the insertion zone), (b) moving the stack to the tray picking area, (c) controlling a robot arm to pick/place items or trays from/to the stack, and (d) removing the stack from the stack containment structure upon completion of the goal of the high-level plan to load/unload the stack. The system may then control one or more robotic systems (e.g., AGVs, robot arms, kitting shelf systems, a conveyor, etc.) in coordination to implement the high-level plan and corresponding lower-level plan(s).

At 725, a determination is made as to whether process 700 is complete. In some embodiments, process 700 is determined to be complete in response to a determination that no further items/trays are to be picked/placed, no further vehicles or stacks are to be inserted to the stack containment structure, a user has exited the system, an administrator indicates that process 700 is to be paused or stopped, etc. In response to a determination that process 700 is complete, process 700 ends. In response to a determination that process 700 is not complete, process 700 returns to 705.

Figure 8:
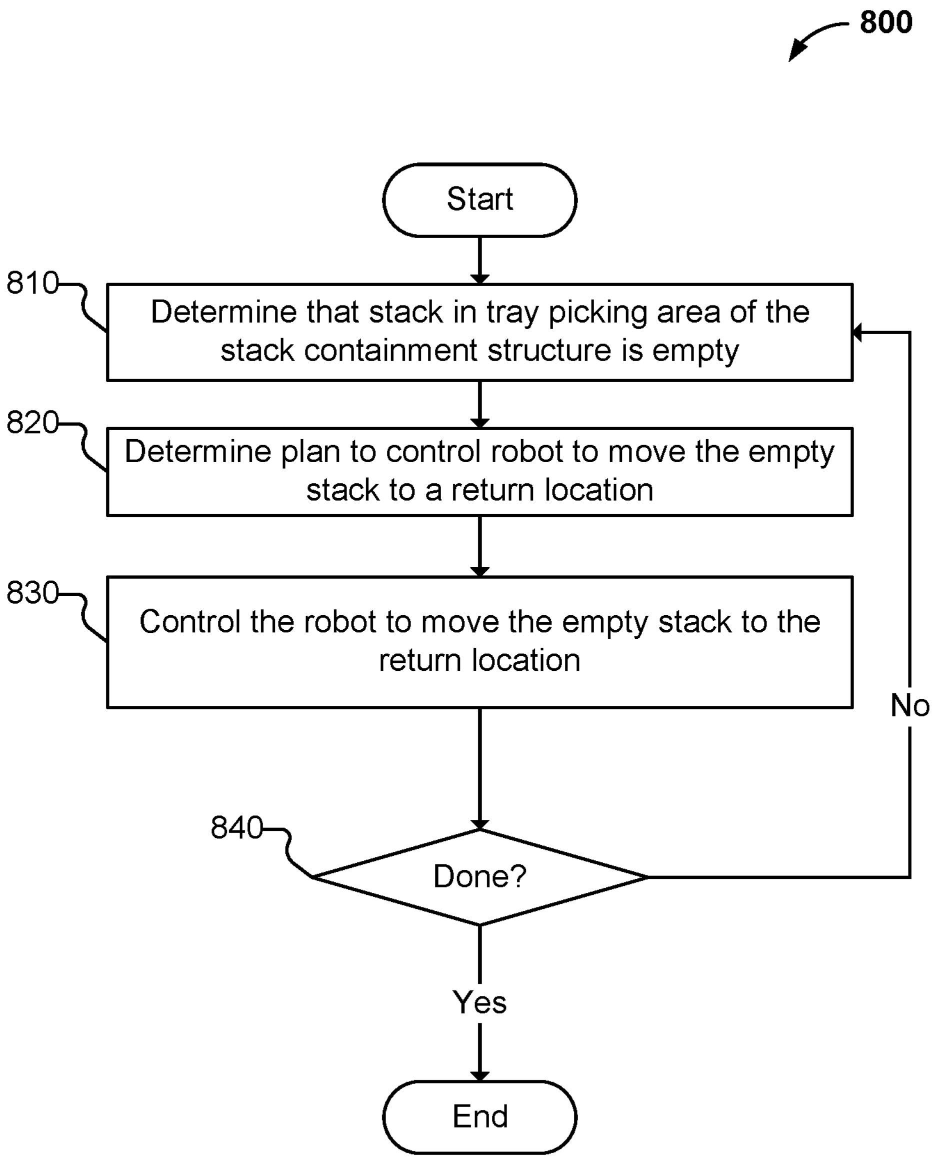
FIG. 8 is a flow diagram of a process for removing a vehicle or stack from a stack containment structure according to various embodiments.

FIG. 8 is a flow diagram of a process for removing a vehicle or stack from a stack containment structure according to various embodiments. According to various embodiments, process 800 is implemented in connection with system 100 of FIG. 1A and/or system 200 of FIG. 2. Process 800 may be implemented in connection with a system comprising stack containment structure such as stack containment structure 400 of FIG. 4.

In some embodiments, process 800 is implemented when a tray stack is unloaded, such as when a robot arm de-stacks the tray stack (e.g., and places the trays at corresponding destination locations such as a conveyor), etc.

At 810, the system determines that the stack in the tray picking area of the stack containment structure is empty. The system may determine that the stack is empty based on information obtained from the vision system for the workspace (e.g., based on a model of the workspace generated using information obtained by the vision system), or based on an indication that the robot arm has successfully completed the unloading the stack.

At 820, the system determines a plan to control a robot to move the empty stack to a return location. In response to determining that the stack is empty (e.g., no further trays are on the vehicle on which the stack was inserted into the stack containment structure), the system determines to remove the empty stack from the stack containment structure and move the empty stack to a predefined vehicle return location. The predefined vehicle return location may be an input end to a stack mover system or a buffer/staging area to a stack mover system. Subsequently, the system may control to recirculate the empty stack such as to a system that control a robot to load the stack with trays, etc.

The plan to control the robot to move the empty stack may include a plan to move the robot to a predefined location or range of the empty stack and a strategy for grasping the empty stack (e.g., the vehicle) from the tray placing area (e.g., the kitting area) of the stack containment structure. The plan may further include a strategy/lower-level plan to move the robot (e.g., move within the workspace, re-configure an orientation of the robot arm) and place the empty stack at the return location.

At 830, the system controls the robot to move the empty stack to the return location. In response to determining the plan to control the robot to return the empty stack to the empty stack, the system (e.g., a control computer) causes the robot to operate to grasp the empty stack, moving the empty stack to the return location, and placing the empty stack at the return location. The operating the robot to grasp the empty stack may include operating an end effector mounted to the robot to grasp the empty stack, such as using a gripper arms or other structure to lift the empty stack.

At 840, a determination is made as to whether process 800 is complete. In some embodiments, process 800 is determined to be complete in response to a determination that the empty stack is successfully removed from the stack containment structure, no further vehicles or stacks are to be removed from other stack containment structures within the workspace, a user has exited the system, an administrator indicates that process 800 is to be paused or stopped, etc. In response to a determination that process 800 is complete, process 800 ends. In response to a determination that process 800 is not complete, process 800 returns to 810.

Although process 800 describes a method in which the stack in the stack containment structure is empty, a similar process for removing the stack may be implemented in contexts according to which a stack is full (e.g., in the case of trays being stacked on vehicles) or partly full, such as in response to a determination that the picking/placing operations with respect to the stack are complete (e.g., the loading/unloading according to a manifest is complete).

Figure 9:
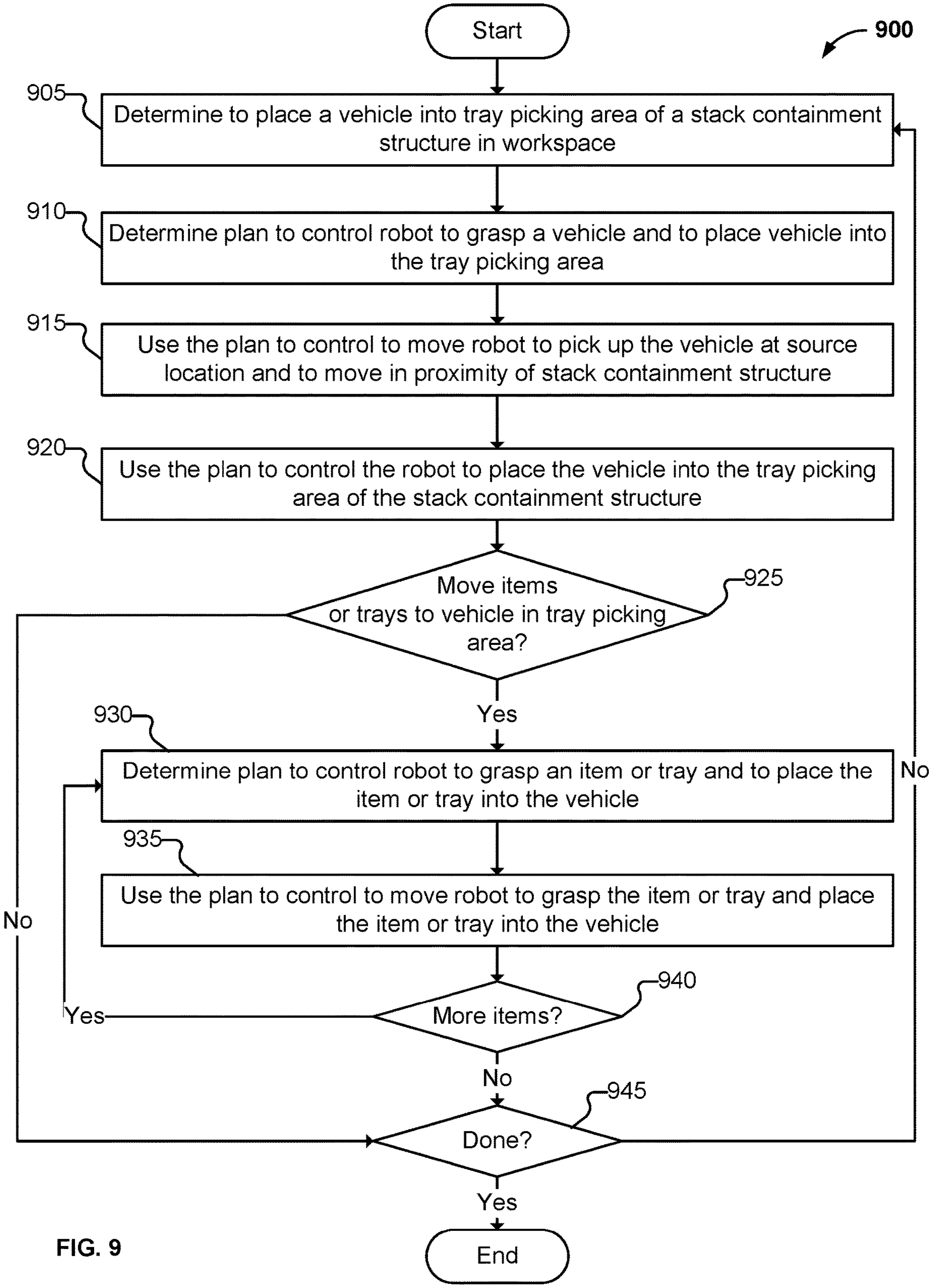
FIG. 9 is a flow diagram of a process for moving items in a robotic kitting system according to various embodiments.

FIG. 9 is a flow diagram of a process for moving items in a robotic kitting system according to various embodiments. According to various embodiments, process 900 is implemented in connection with system 100 of FIG. 1A and/or system 200 of FIG. 2. Process 900 may be implemented in connection with a system comprising stack containment structure such as stack containment structure 400 of FIG. 4.

At 905, the system determines to place a vehicle in the tray placing location of a stack containment structure in a workspace (e.g., a workspace of a robot). The tray placing location may correspond to kitting area 408 of stack containment structure 400. For example, the tray picking area corresponds to a location at which the stack is supported by stack containment structure while the robot arm is controlled to pick/place items or trays from/to the stack. The system may determine to place the vehicle in the tray placing location (e.g., the kitting area) in connection with determining that the system is to control a robot to load/unload the vehicle, such as performing picking/placing operations of items/trays from/to the vehicle.

At 910, the system determines a plan to control a robot(s) to grasp a vehicle and place the vehicle in the tray placing location. The system may determine a plan to: (i) control a robot, such as an AGV, (ii) move to a source location, (iii) grasp the vehicle (e.g., pick up, or push/pull the vehicle), (iv) move the vehicle to the stack containment structure, (v) introduce the vehicle to the stack containment structure such as to an insertion zone of the stack containment structure, and (vi) controlling the robot or a different robot (e.g., a robot arm within range of the stack containment structure) to move the vehicle from the insertion zone to the tray placing area (e.g., the kitting area) of the stack containment structure. The system may use a model of the workspace (e.g., including information pertaining to the source location, the stack containment structure, and/or workspace of the robot arm that performs pick/place operations with respect to the vehicle) to determine the plan to control the robot(s) to grasp the vehicle and place the vehicle in the tray playing location. For example, the system may generate the model based at least in part on information obtained by a vision system for the system.

In some embodiments, the plan to control a robot(s) to grasp a vehicle and place the vehicle in the tray placing location corresponds to a plan for the system to control various components within the workspace in coordination to insert vehicles to the stack containment structure and to load/unload the vehicles (e.g., pick/place trays or items from/to the vehicle). For example, the system may control a vehicle introduction robot (e.g., an AGV) and a robot arm for picking/placing items or trays in coordination to accomplish the high-level goal/plan of loading/unloading the vehicle. The system may further control a conveyor, etc.

At 915, the system uses the plan to control to move the robot to grasp the vehicle at a source location and to move the robot to within proximity of the stack containment structure. For example, the robot (e.g., an AGV, etc.) moves the vehicle to within a predefined distance from the stack containment structure.

At 920, the plan is used to control the robot to place the vehicle into the tray picking area (e.g., the kitting area or also referred to herein as the tray placing area) of the stack containment structure.

At 925, the system determines whether items or trays are to be moved to the tray in the tray picking location. The system may determine whether the items/trays are to be moved to the tray in the stack containment structure based on a high-level plan such as a plan for kitting a set of items/trays for a manifest, order, etc.

In response to determining that the items or trays are to be moved to the vehicle at 930, process 900 proceeds to 930.

At 930, a plan to control a robot to grasp the item or tray and place the item or tray in the vehicle in the tray picking area (e.g., the kitting area or tray placing area). The system may use a model of the workspace in connection with determining the plan.

At 935, the robot is controlled to grasp the item or tray and place the item or tray in the vehicle. The system uses the plan to control the robot to pick and place the item/tray in the vehicle.

In response to determining that no items/trays are to be moved to the vehicle at 925, process 900 proceeds to 945.

At 945, a determination is made as to whether process 900 is complete. In some embodiments, process 900 is determined to be complete in response to a determination that the empty stack is successfully removed from the stack containment structure, no further vehicles or stacks are to be removed from other stack containment structures within the workspace, a user has exited the system, an administrator indicates that process 900 is to be paused or stopped, etc. In response to a determination that process 900 is complete, process 900 ends. In response to a determination that process 900 is not complete, process 900 returns to 905.

Although process 900 provides an example in which items or trays are moved to the vehicle in the tray placing location, various embodiments include a similar process in which items or trays are picked from the vehicle and moved to a destination location in the workspace (e.g., a conveyor, a kitting shelf system, etc.).

Figure 10:
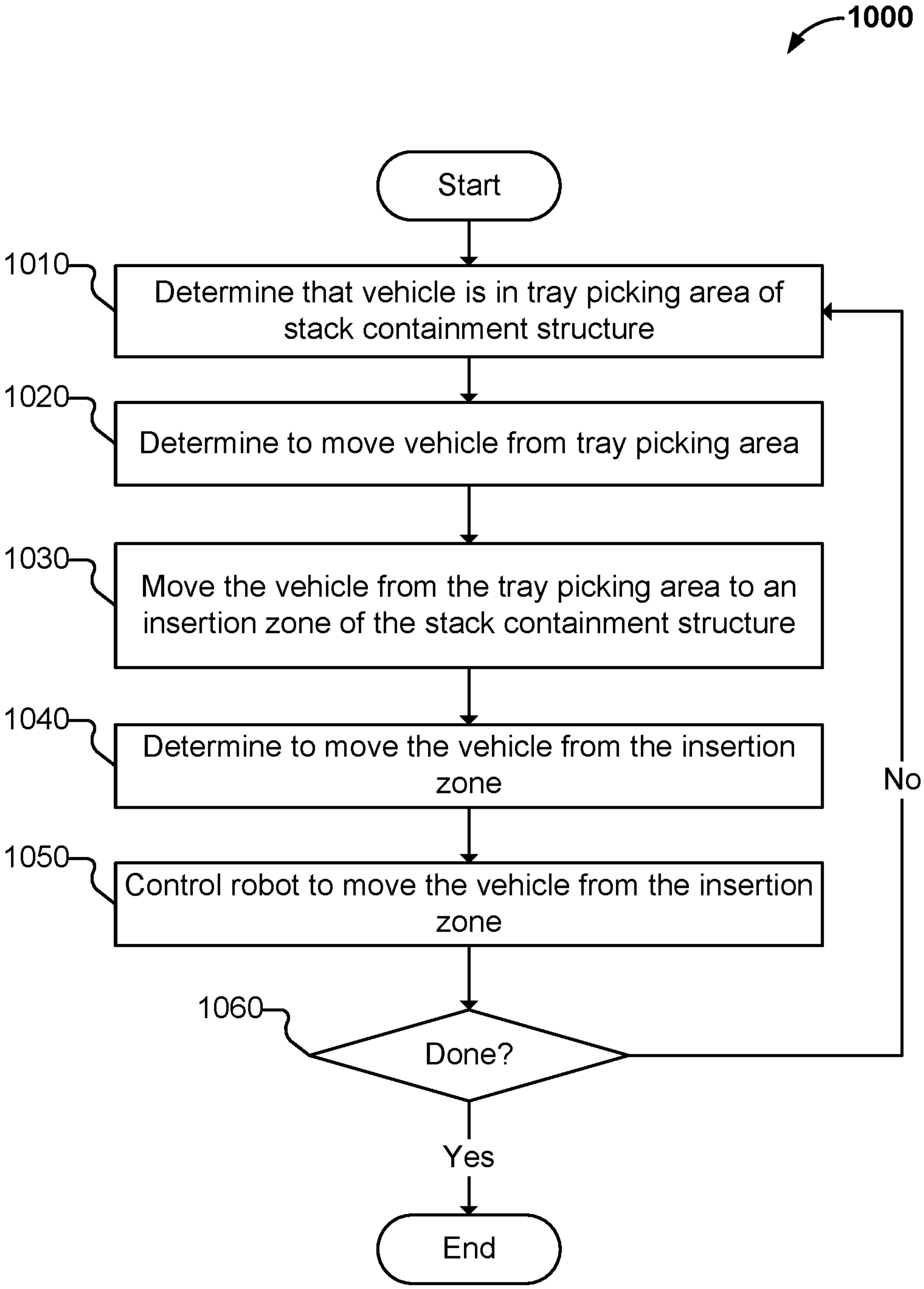
FIG. 10 is a flow diagram of a process for moving a vehicle from a stack containment structure according to various embodiments.

FIG. 10 is a flow diagram of a process for moving a vehicle from a stack containment structure according to various embodiments. According to various embodiments, process 1000 is implemented in connection with system 100 of FIG. 1A and/or system 200 of FIG. 2. Process 1000 may be implemented in connection with a system comprising stack containment structure such as stack containment structure 400 of FIG. 4.

At 1010, a determination is made that a vehicle is in the tray placing area of the stack containment structure. For example, the system uses a model generated based on information obtained by a vision system within the workspace to determine that a vehicle or stack is within stack containment structure.

At 1020, a determination is made to move the vehicle from the tray placing area. In some embodiments, the system determines to move the vehicle from the tray placing area in response to determining that the picking/placing operations with respect to the vehicle is complete. For example, the system determines to move the vehicle from the tray placing area in response to determining that a vehicle has been loaded (e.g., according to a manifest, packing slip, order, etc.) by the robot. As another example, the system determines to move the vehicle from the tray placing area in response to determining that a stack of trays has no more trays or that no further trays are to be removed by the robot.

At 1030, the vehicle is moved from the tray placing area to an insertion zone of the stack containment structure. In some embodiments, the moving the vehicle from the tray placing area (e.g., the kitting area) to the insertion zone comprises controlling a robot (e.g., a robotic arm within range of stack containment structure) to push or pull the vehicle from the tray placing area to the insertion zone. Funnels or guides comprised in the stack containment structure may assist with guiding the vehicle to the insertion zone even if the force applied by the robot is not precisely in the direction in which the vehicle is to move from the tray placing area to the insertion zone.

At 1040, the system determines to move the vehicle from the insertion zone. The system may determine to move the vehicle from the insertion zone based on a determination of one or more of (i) no further pick/place operations are to be performed with respect to the vehicle, (ii) the vehicle has no further trays to be removed, (iii) the vehicle comprises a stack comprising a number of trays that exceeds predefined stack threshold, (iv) the vehicle comprises a stack having a height that exceeds a predefined height threshold, (v) the loading/unloading for a particular manifest or order is complete, (vi) a user has provided an instruction to remove the vehicle (e.g., via a user interface on a client terminal), (vi) a different vehicle or stack of trays is to be inserted to the stack containment structure, etc.

At 1050, the system controls the robot to move the vehicle from the insertion zone. In some embodiments, the system determines a plan for moving the vehicle from the insertion zone, such as a plan for removing the vehicle from the stack containment structure. The system may determine a plan and control a robot to move towards the stack containment structure and to remove the vehicle and/or stack from the insertion zone. As an example, removing the vehicle from the stack containment structure may include pulling the vehicle/stack through the opening in the insertion zone structure (e.g., through a space between a first insertion zone support structure and a second insertion zone support structure). As another example, removing the vehicle from the stack containment structure may include lifting the vehicle/stack up vertically and carrying the vehicle/stack to an area outside the stack containment structure.

The robot controlled to move the vehicle from the insertion zone may be an AGV, a robot arm disposed in the workspace to insert/remove tray stacks to the stack containment structure (e.g., after an AGV placed the tray stack within proximity of such robot arm), etc.

According to various embodiments, instead of controlling to the robot to move the vehicle from the insertion zone at 1050, the system provides an indication to a user for the user to manually remove the vehicle. For example, the system configures a user interface on a terminal used by the user such that the user interface provides an alert or prompt that the vehicle is ready for removal.

At 1060, a determination is made as to whether process 1000 is complete. In some embodiments, process 1000 is determined to be complete in response to a determination that the empty stack is successfully removed from the stack containment structure, no further vehicles or stacks are to be removed from other stack containment structures within the workspace, a user has exited the system, an administrator indicates that process 1000 is to be paused or stopped, etc. In response to a determination that process 1000 is complete, process 1000 ends. In response to a determination that process 1000 is not complete, process 1000 returns to 1010.

Although the foregoing embodiments have been described in connection with the grasping, moving, and placing one or more trays, various other receptacles or containers may be implemented. Examples of other receptacles or containers include bags, boxes, pallets, crates, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A stack containment fixture, comprising:

an insertion zone structure comprising a pair of substantially vertically oriented deflecting arms, each having one or more funnels configured to guide a stack into a position between the deflecting arms as the stack is lowered into the insertion zone structure from above, wherein the insertion zone structure is configured to receive the stack from a vehicle that drops off the stack in the insertion zone structure, and wherein the deflecting arms are configured to elastically deflect to accommodate positional tolerances of the vehicle during insertion and to allow a robotic arm to pull the stack horizontally from the insertion zone structure to a kitting area structure; and the kitting area structure that is configured to support the stack during kitting operations for items being placed in the stack or for items being picked from the of stack.

2. The stack containment fixture of claim 1, wherein the stack comprises a stack of trays.

3. The stack containment fixture of claim 1, further comprising one or more mounting mechanisms to mount the stack containment fixture to a surface in a warehouse.

4. The stack containment fixture of claim 1, wherein the insertion zone structure comprises at least two insertion zone support structures that are deformable and configured to hold a stack of predefined size.

5. The stack containment fixture of claim 4, wherein the kitting area structure comprises a plurality of kitting area support structures that are configured to hold the stack.

6. The stack containment fixture of claim 5, wherein the plurality of kitting area support structures is sufficiently rigid to provide support to the stack while a robotic is performing the kitting operations.

7. The stack containment fixture of claim 5, wherein the plurality of kitting support structures and the at least two insertion zone support structures are connected to at least one base structure.

8. The stack containment fixture of claim 7, further comprising:

a first base structure of the at least one base structure to which a first kitting support structure and a first insertion zone support structure are connected; and a second base structure of the plurality of kitting area support structures to which a second kitting support structure and a second insertion zone support structure are connected; and wherein the first base structure and the second base structure are on opposing sides of an insertion zone area defined by the insertion zone structure.

9. The stack containment fixture of claim 5, wherein the plurality of kitting area support structures comprises at least two kitting area support structures that are configured to enable a robotic arm to grasp a tray from the stack on opposing sides using an end effector comprising gripper arms.

10. The stack containment fixture of claim 9, wherein the at least two kitting area support structures are shaped to expose at least two opposing sides of the kitting support area.

11. The stack containment fixture of claim 4, wherein the insertion zone structure comprises a bump stop structure that restricts an amount of deflection of at least one insertion zone support structure.

12. The stack containment fixture of claim 1, wherein:

the kitting area structure defines a kitting zone at which the stack is positioned during the kitting operation; and the kitting area structure comprises one or more funneling structures that are configured to guide an object towards the kitting zone during kitting operations to place items in the stack.

13. The stack containment fixture of claim 12, wherein the one or more funneling structures comprise angled surfaces that are angled towards the kitting zone.

14. The stack containment fixture of claim 1, wherein:

the kitting area defines a kitting area in which the stack is positioned during the kitting operations; and the kitting area structure comprises an end stop structure that defines a side the kitting area.

15. The stack containment fixture of claim 14, wherein the end stop structure is removable with respect to the stack containment fixture.

16. The stack containment fixture of claim 14, wherein:

the insertion zone structure defines an insertion zone;

the kitting area structure and the insertion zone structure are configured to guide the stack to move from the insertion zone to the kitting area; and the end stop structure restricts movement of the stack in a direction from which the stack moves from an insertion zone area to the kitting area.

17. The stack containment fixture of claim 1, wherein:

the insertion zone comprises at least two insertion zone support structures configured to hold a stack of predefined size;

the kitting area comprises at least two kitting area support structures configured to hold a stack of predefined size; and the at least two insertion zone support structures are more flexible than the at least two kitting area support structures.

18. The stack containment fixture of claim 1, wherein the stack containment fixture is deployed in connection with a kitting system comprising a robot arm configured to pick or place items with respect to the stack.

19. The stack containment fixture of claim 1, wherein the deflecting arms deflect to allow stack to be pulled from insertion zone to kitting area.

20. The stack containment fixture of claim 19, wherein the deflecting arms are configured to allow the stack to be pulled out of insertion zone in a direction opposite the kitting area.

21. The stack containment fixture of claim 1, wherein the one or more funnels comprise outwardly angled tabs.

22. The stack containment fixture of claim 21, wherein the deflecting arms are sheet metal, and the one or more funnels are sheet metal tabs.

23. An autonomous tray handling robotic system comprising the stack containment of claim 1, wherein the system further comprises:

a memory configured to store data indicating a set of kits to be assembled, at least one kit is defined to include an item picked from the stack; and a processor coupled to the memory and configured to control operation of one or more robots, each of the one or more robots being configured to grasp, move, and iteratively pick one or more first items from the stack and assemble the set of kits according to a plan.

24. The autonomous tray handling robotic system of claim 23, wherein:

the insertion zone structure defines an insertion zone in which the stack is inserted;

the kitting area structure defines a kitting area to which the stack is moved from the insertion zone; and the plan includes controlling the one or more robots to engage the stack comprised in the insertion zone and controlling the one or more robots to move the stack to the kitting area.

25. The stack containment fixture of claim 1, wherein the vehicle is an automated guided vehicle (AGV).

26. A stack containment fixture, comprising:

an insertion zone structure comprising a pair of substantially vertically oriented deflecting arms, each having one or more funnels configured to guide a stack into a position between the deflecting arms as the stack is lowered into the insertion zone structure from above; and a kitting area structure that is configured to support the stack during kitting operations for items being placed in the stack or for items being picked from the stack, wherein the insertion zone structure comprises (i) at least two insertion zone support structures that are deformable and configured to hold a stack of predefined size, and (ii) a bump stop structure that restricts an amount of deflection of at least one insertion zone support structure.

27. A stack containment fixture, comprising:

an insertion zone structure comprising a pair of substantially vertically oriented deflecting arms, each having one or more funnels configured to guide a stack into a position between the deflecting arms as the stack is lowered into the insertion zone structure from above; and a kitting area structure that is configured to support the stack during kitting operations for items being placed in the stack or for items being picked from the stack, wherein:

the insertion zone comprises at least two insertion zone support structures configured to hold a stack of predefined size;

the kitting area comprises at least two kitting area support structures configured to hold a stack of predefined size; and the at least two insertion zone support structures are more flexible than the at least two kitting area support structures.

28. A stack containment fixture, comprising:

an insertion zone structure comprising a pair of substantially vertically oriented deflecting arms, each having one or more funnels configured to guide a stack into a position between the deflecting arms as the stack is lowered into the insertion zone structure from above;

a kitting area structure that is configured to support the stack during kitting operations for items being placed in the stack or for items being picked from the stack; and one or more mounting mechanisms to mount the stack containment fixture to a surface in a warehouse.

29. An autonomous tray handling robotic system comprising:

a stack containment fixture, comprising:

an insertion zone structure comprising a pair of substantially vertically oriented deflecting arms, each having one or more funnels configured to guide a stack into a position between the deflecting arms as the stack is lowered into the insertion zone structure from above; and a kitting area structure that is configured to support the stack during kitting operations for items being placed in the stack or for items being picked from the stack;

a memory configured to store data indicating a set of kits to be assembled, at least one kit is defined to include an item picked from the stack; and a processor coupled to the memory and configured to control operation of one or more robots, each of the one or more robots being configured to grasp, move, and iteratively pick one or more first items from the stack and assemble the set of kits according to a plan.

* * * * *